United States Patent [19]
Saito

[11] Patent Number: 5,724,155
[45] Date of Patent: Mar. 3, 1998

[54] ELECTRONIC IMAGING SYSTEM

[75] Inventor: Yawara Saito, Hachiohji, Japan

[73] Assignee: Olympus Optical Co., Ltd., Tokyo, Japan

[21] Appl. No.: 366,893

[22] Filed: Dec. 30, 1994

[30]    Foreign Application Priority Data

Dec. 30, 1993 [JP] Japan ................. 5-351087

[51] Int. Cl.$^6$ .................... H04N 1/00; H04N 1/32
[52] U.S. Cl. ............... 358/402; 358/403; 358/407; 358/468
[58] Field of Search ....................... 358/402, 403, 358/407, 468, 462

[56]    References Cited

U.S. PATENT DOCUMENTS

| | | | |
|---|---|---|---|
| 4,553,206 | 11/1985 | Smutek et al. | 364/300 |
| 4,587,633 | 5/1986 | Wang et al. | 358/462 |
| 5,231,501 | 7/1993 | Sakai | 358/906 |

OTHER PUBLICATIONS

"Microsoft Mail for Windows", May 1993, p. 5.

"Microsoft Mail"for Windows, May 1993, pp. 1, 5, 17.

*Primary Examiner*—Edward L. Coles, Sr.
*Assistant Examiner*—Tia M. Harris
*Attorney, Agent, or Firm*—Cushman, Darby & Cushman IP Group of Pillsbury Madison, & Sutro LLP

[57]    ABSTRACT

An electronic imaging system is disclosed which is capable of transmission and reception of image data and/or data stored in recording media with a small size modem and taking a great amount of picked-up image, and filing and taking them for a personal computer network host at a desired timing. Data communication means transmits image data obtained through by an image means and/or data stored in a mounted information storage medium in a system conforming to an inter-personal computer communication system fitted for network organization.

26 Claims, 25 Drawing Sheets

FIG. 6

PROTOCOL DESCRIPTION LANGUAGE

| CODE (&H) | FUNCTION |
|---|---|
| 00 | NOP |
| 01 | • CHECK WHETHER ASSIGNED CHARACTER SERIES CAN BE RECEIVED IN ASSIGNED TIME<br>• 2ND BYTE IS ASSIGNED TIME<br>• 3RD & FOLLOWING BYTES ARE RETRIEVAL CHARACTER SERIES ( LEADING REPRESENTS NUMBER OF CHARACTERS ) |
| 02 | • TRANSMIT ASSIGNED CHARACTER SERIES<br>• 2ND & FOLLOWING BYTES ARE CHARACTER SERIES TO BE TRANSMITED ( LEADING REPRESENTS NUMBER CHARACTERS ) |
| 03 | DIAL OF ASSIGNED TEL. NO. |
| 04 | TRANSMISSION OF ASSIGNED ID |
| 05 | TRANSMISSION OF ASSIGNED PASSWORD |
| 06 | TRANSMISSION OF ASSIGNED FILE ACCORDING TO XMODEM PROTOCOL |
| 07 | RECEPTION OF ASSIGNED FILE ACCORDING TO XMODEM PROTOCOL |
| 08 | MAKE LIST OF IMAGE FILE FROM MAIL LIST |
| 09 | ER "ON" AND DR CONFIRMATION |
| 0A | ER "OFF" |
| 0B | RS "ON" AND CS CONFIRMATION |
| 0C | RS "OFF" |
| 0E | CD CONFIRMATION |

FIG. 7

PROTOCOL DESCRIPTION EXAMPLE ( LOGIN )

| 09 |
|---|
| 02,07,"AT&F¥N3"   ( MODEM SETTING ) |
| 02,0D,"DTΦXXXXXXXXXX"  ( DIAL ) |
| 01,20,04,"NET1" |
| ⋮ |

FIG. 8

MAP OF COMM. DESTINATION REGISRATION PORTION

|  | PROTOCOL | TEL. NO. | ID | PASSWORD | COMMENT |
|---|---|---|---|---|---|
| COMM. DEST. 1 | | | | | |
| COMM. DEST. 2 | | | | | |
| COMM. DEST. 3 | | | | | |
| COMM. DEST. 4 | | | | | |

FIG. 9

CODE ASSIGNMENT OF PROTOCOL COLUMN

| 00 | NON-REGISTRATION |
|---|---|
| 01 | PROTOCOL 1 |
| 02 | PROTOCOL 2 |
| 03 | PROTOCOL 3 |
| 04 | PROTOCOL 4 |
| 0F | PROCEDURE ON FILE ( PROTOCOL. CTL ) |
| 0E | MANUAL |

FIG. 10

```
REGISTRATION MENU

▷ COMM. DEST. REGISTRATION
  PROTOCOL REGISTRATION
```

FIG. 11

```
IN PROTOCOL REGISTRATION

PROTOCOL.DAT
```

FIG. 12

```
COMM. DEST. REGISTRATION
    COMM. DEST. 1      XXXXXX
        PROTOCOL 01    NETWORK 1
        TEL       TONE XXXXXXX
        ID             XXXXXXXX
        PASSWORD       XXXXXXXX
```

FIG. 19

```
┌─────────────────────────────────┐
│ SCREEN SELECTION      END       │
│                                 │
│                                 │
│                                 │
│                                 │
│                                 │
└─────────────────────────────────┘
```

FIG. 21

```
RECEPTION LOGIN           1

▷ COMM. DEST. 1    NET 1
  COMM. DEST. 2    NET 2
  COMM. DEST. 3    OLYMPUS
  COMM. DEST. 4    MANUAL
```

FIG. 22

```
MAIL LIST

○ 3 FILES

○ TOTAL 126K BYTES

RECEIVE ?
```

FIG. 23

```
IN RECEPTION

○ IN 1ST FILE RECEPTION
  ( TOTAL 3 FILES )
○ FILE NAME DS000001.J6I
  65%
```

ELECTRONIC IMAGING SYSTEM

BACKGROUND OF THE INVENTION

The present invention generally relates to an electronic imaging systems for taking, storing, reproducing or retrieving image data from an applied storage device or medium, the systems inclusive of such apparatuses as an electronic still camera or an electronic image data filling apparatus. More particularly, the invention relates to an electronic imaging systems mentioned above further comprising communication means capable of transmitting or receiving image data utilizing a personal computer network.

In recent years, an image information storing or recording apparatus, and/or, retrieving or reproducing apparatus, such as an electronic still camera or an electronic image data filling apparatus for storing or retrieving image data on or from an applied storage device or medium, have been developed. Electronic still cameras of conventional type generally employ solid state electronic imaging devices, such as CCD imagers, for photoelectric conversion to obtain a picture signal corresponding to objects intended to be picked up or photographed. The picture signal issued from the imaging device is processed by a conventional processing circuit to obtain a video or TV signal able to be recorded or stored, and the processed signal is converted into a digital form representative of the image information intended to be stored. In the above mentioned cameras, the image information is represented and conveyed in the form of digital data. Following the trend of the times, an electronic still camera, which outputs image data whose format may be compatible for either the IBM Personal Computer and related architectures or the Apple Mackintosh PC architecture as selected by the operator is proposed. This electronic still camera is disclosed in the U.S. Pat. No. 5,138,459. The digital data stored in the applied storage device or medium preferably takes the compressed form thereof, utilizing the encoding data compression technique (see U.S. Pat. No. 5,034,804)or variable-length encoding data compression technique (see U.S. Pat. No. 5,027,214). According to such variable-length data compression encoding, since an image data can be compressed in accordance with contents of an image so as to be reduced in amount, a large number of electronic still images can be stored in a semiconductor memory card as the applied storage device or medium while the memory area on the memory card required to store one electronic still image is reduced.

Meanwhile, a still video apparatus which has a device for interfacing with an external image data processing device has been previously proposed (see U.S. Pat. No. 5,231,501). The still video apparatus comprises a signal output device for outputting an electrical image signal and a signal converter for converting the image signal to an image data signal which can be processed by an external image data processing device such as a personal computer.

Recently, there have been many proposals for electronic imaging systems having multiple functions, such as DSC (digital still video camera), using such a storage media as an IC memory card, magnetic storage medium, opto-magnetic storage medium, flash memory, etc. As one of such proposals, there is a DSC capable of personal computer network communication with image data transmission and reception system for external apparatuses.

For personal computer network application to the above prior art image data transmission and reception by the DSC, however, it is necessary to make use of personal computers, and it has been impossible to easily realize the transmission and reception of image data. In addition, for the transmission and reception of the image data or the like by the DSC, the storage medium is mounted, causing difficulty in handling.

SUMMARY OF THE INVENTION

An object of the present invention is therefore to provide an electronic imaging system capable of transmission and reception of image data and/or data stored in recording media only with a small size modem or the like.

Another object of the present invention is to provide an electronic imaging system capable of taking a great amount of picked-up image, and filing and taking the images for a personal computer network host at a desired timing.

According to an aspect of the present invention, there is provided an electronic imaging system comprising data communication means for transmitting image data obtained through an image means and/or data stored in a mounted information storage medium in a system conforming to an inter-personal computer communication system fitted for network organization.

According to another aspect of the present invention, there is provided an electronic imaging system incorporating information storing means of comparatively large capacity and comprising external control mode means for permitting independent accessing of the information storing means from an external unit via communication means.

According to other aspect of the present invention, there is provided an electronic imaging system comprising image pick-up means for generating and outputting an image signal photoelectrically converted from an image incident thereon, image data storing means for storing an image data corresponding to the image signal issued from the image pick-up means on an applied storage device or medium, data communication means for transmitting a designated image data in the device or medium through a personal computer network organization while an operation mode of the system is set for communication, and switch means for causing the communication means to start a communication mode operation.

Other objects and features will be clarified from the following description with reference to attached drawings.

BRIEF DESCRIPTION OF THE DRAWINGS

FIG. 6 shows the protocol description language applied to the DSC 20;

FIG. 7 is a view showing a protocol description example for login process using the code in FIG. 6;

FIG. 8 shows the map of the communication destination registration portion which is written in the EEPROM 16;

FIG. 9 shows the codes to be written in the above protocol column;

FIGS. 10 to 12 show the EVF or a monitor screen for describing a communication protocol write-in operation;

FIGS. 16 to 19 show the routines of the image file transmission;

FIG. 21 shows a selected communication destination displayed on monitor;

FIG. 22 shows a mail list;

FIG. 23 shows a screen "IN RECEPTION";

DETAILED DESCRIPTION OF THE PREFERRED EMBODIMENTS

Now, preferred embodiments of the present invention will be described with reference to the drawings.

Figure 1:
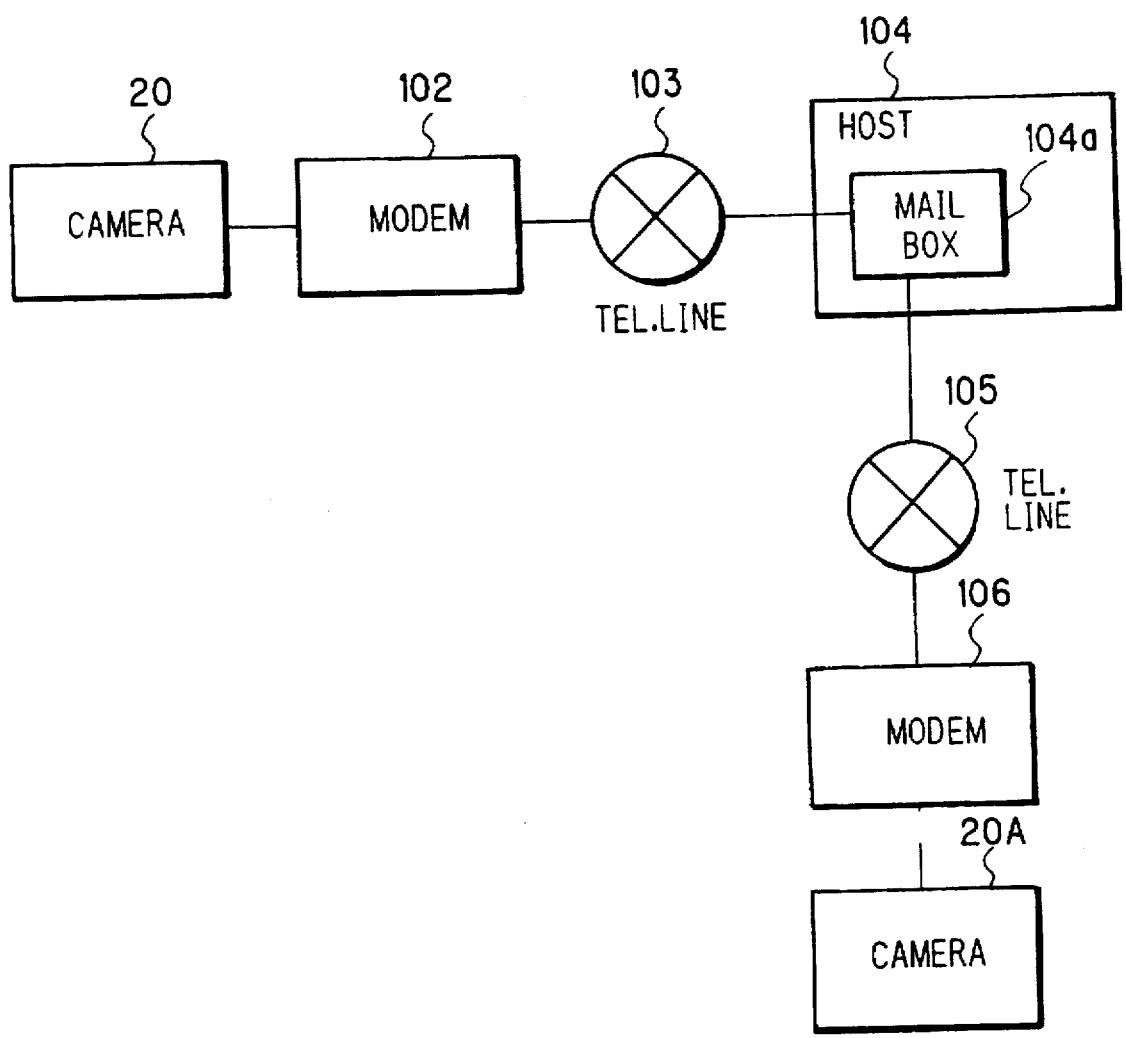
FIG. 1 is a block diagram showing a first embodiment of the electronic imaging system according to the present invention.

FIG. 1 is a block diagram showing a first embodiment of the electronic imaging system according to the present invention applied to the case where image data and/or speech data, control data, etc. from DSC 20 or 20A are transmitted and received by making use of a personal computer network.

As shown, communication of the image data or the like between the DSC 20 or 20A and a personal computer (PC) network host 104 is made via a modem 102 or 106 and telephone lines 103 and 105. Image data transmitted from the DSC 20 is uploadedly written in a mail box 104a in the personal computer (PC) network host 104. The image data in the mail box 104a is downloadedly written in the receiving side DSC 20A.

Figure 2:
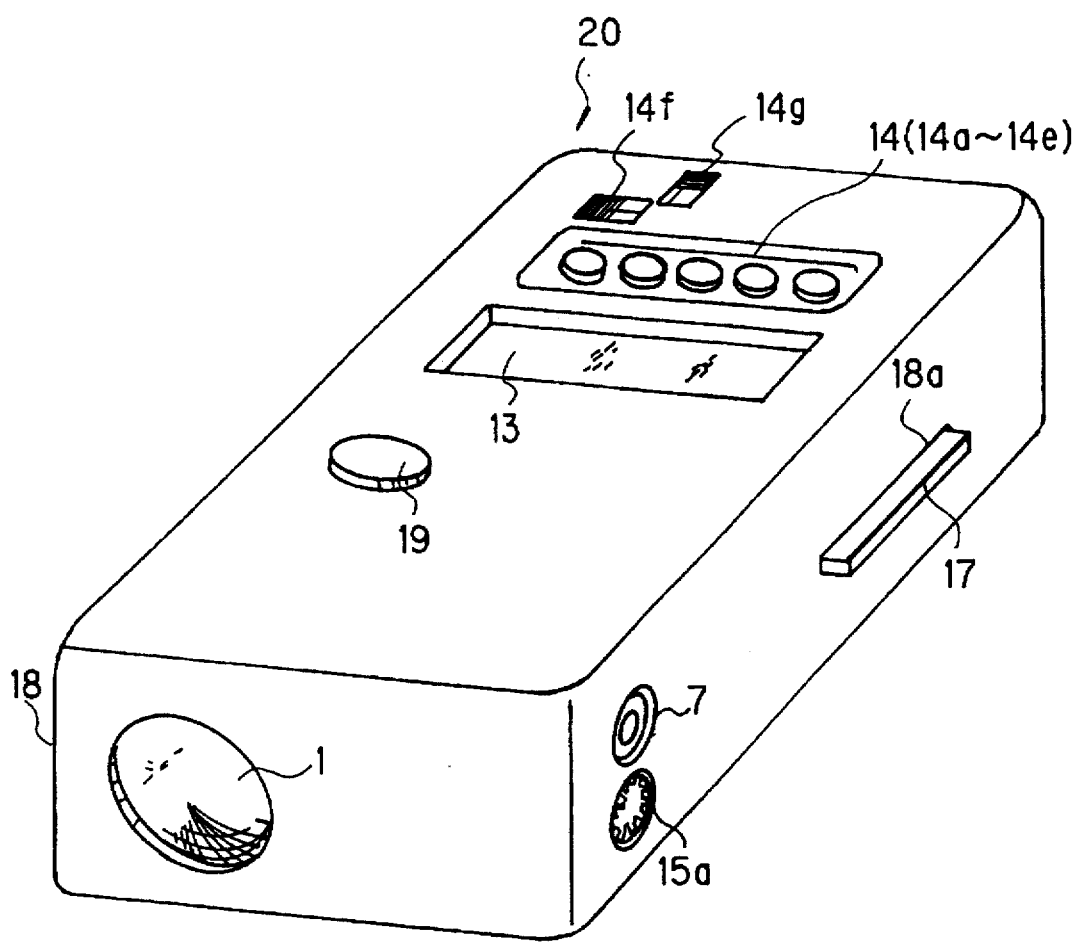
FIG. 2 is a perspective view showing the DSC 20 in the embodiment.

FIG. 2 is a perspective view showing the DSC 20 in this embodiment. It is assumed that the DSC 20 is provided with a personal computer card or like memory card 17 as the image information storage medium. As shown in FIG. 2, the DSC 20 has a camera housing 18, and an image pick-up lens 1 is provided in the front of the housing. The top of the housing 18 is provided with operation switches 14 (14a to 14g), an LCD display 13 and a release switch 19. Further, one side of the housing 18 is provided with a video signal output terminal 7, a connector 15a (See FIG. 4) which is a RS-232C I/F connection portion for transmitting and receiving signals to and from modems or the like external apparatuses, and a slit 18a for inserting a memory card 17 as the storage medium.

Figure 3:
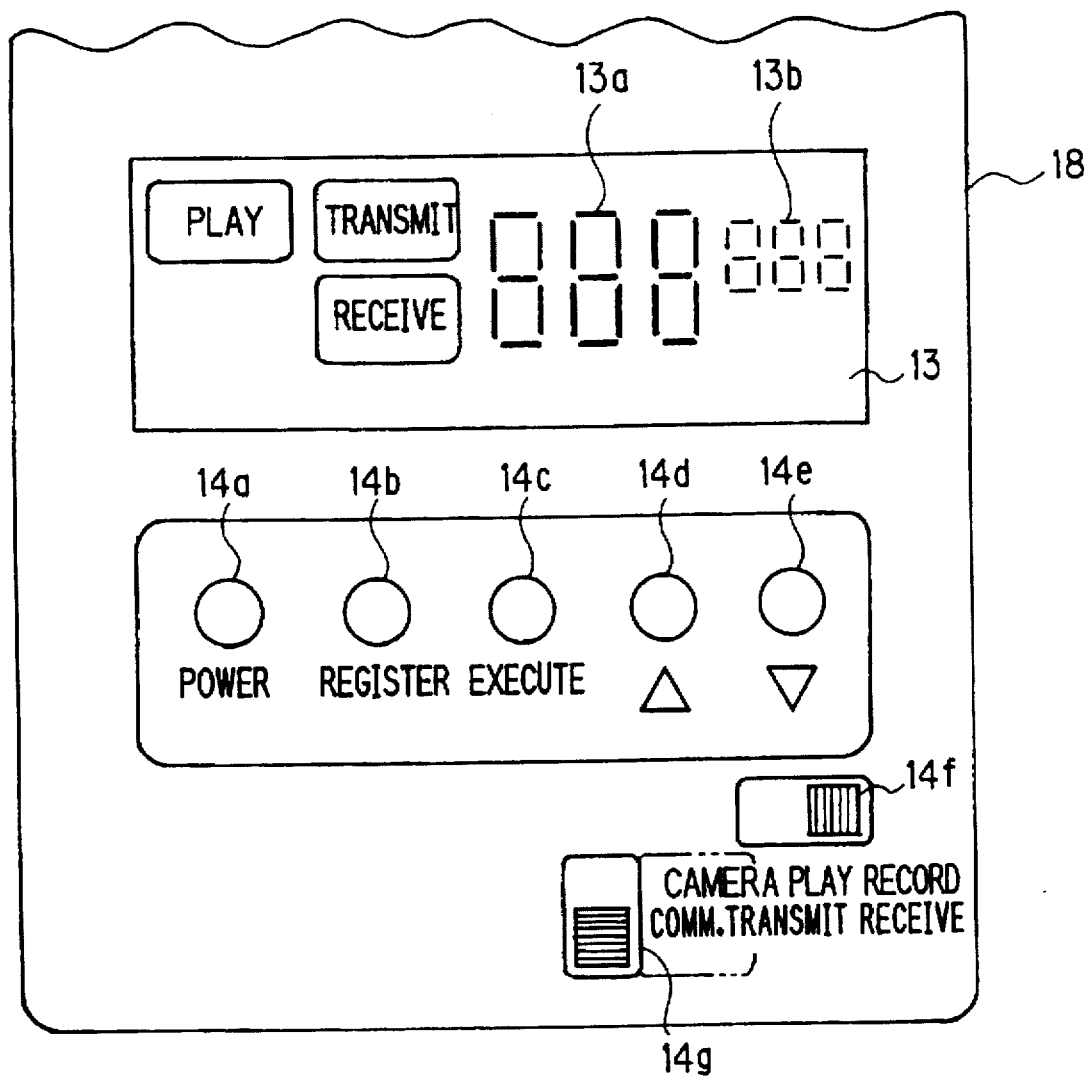
FIG. 3 shows, in an enlarged scale, the operation switches 14 (14a to 14g) and LCD display 13 provided on the top of the DSC housing 18.

FIG. 3 shows, in an enlarged scale, the operation switches 14 (14a to 14g) and LCD display 13 provided on the top of the DSC housing 18.

Of the switches, shown at 14a is a "POWER" switch for the DSC, at 14b a "REGISTER" switch for registering communication protocol (procedure), telephone No., etc. at the time of data communication, at 14c an "EXECUTE" switch to be operated when executing the registration or the data communication, and at 14d and 14e an "UP" and a "DOWN" switch for assigning the reproduction frame No., registered telephone No., etc. Further, shown at 14g is a slide switch for switching a camera mode and a communication mode of the DSC, and at 14f is a slide switch for switching between a "PLAY" and a "RECORD" mode in the camera modes and switching between a "RECEIVE" and a "TRANSMIT" mode in the communication modes. When the DSC is in a mode other than the "RECORD" mode, i.e., the "PLAY", "TRANSMIT" or "RECEIVE" mode, the characters "PLAY", "TRANSMIT" or "RECEIVE" in the LCD display 13 are turned on. Further, in the display 13, central seven-segment digits are for displaying the frame No. being processed or the like, and right upper small-size seven-segment digits are for displaying the number of frames ready for picking up image or number of residual frames that can be reproduced.

Figure 4:
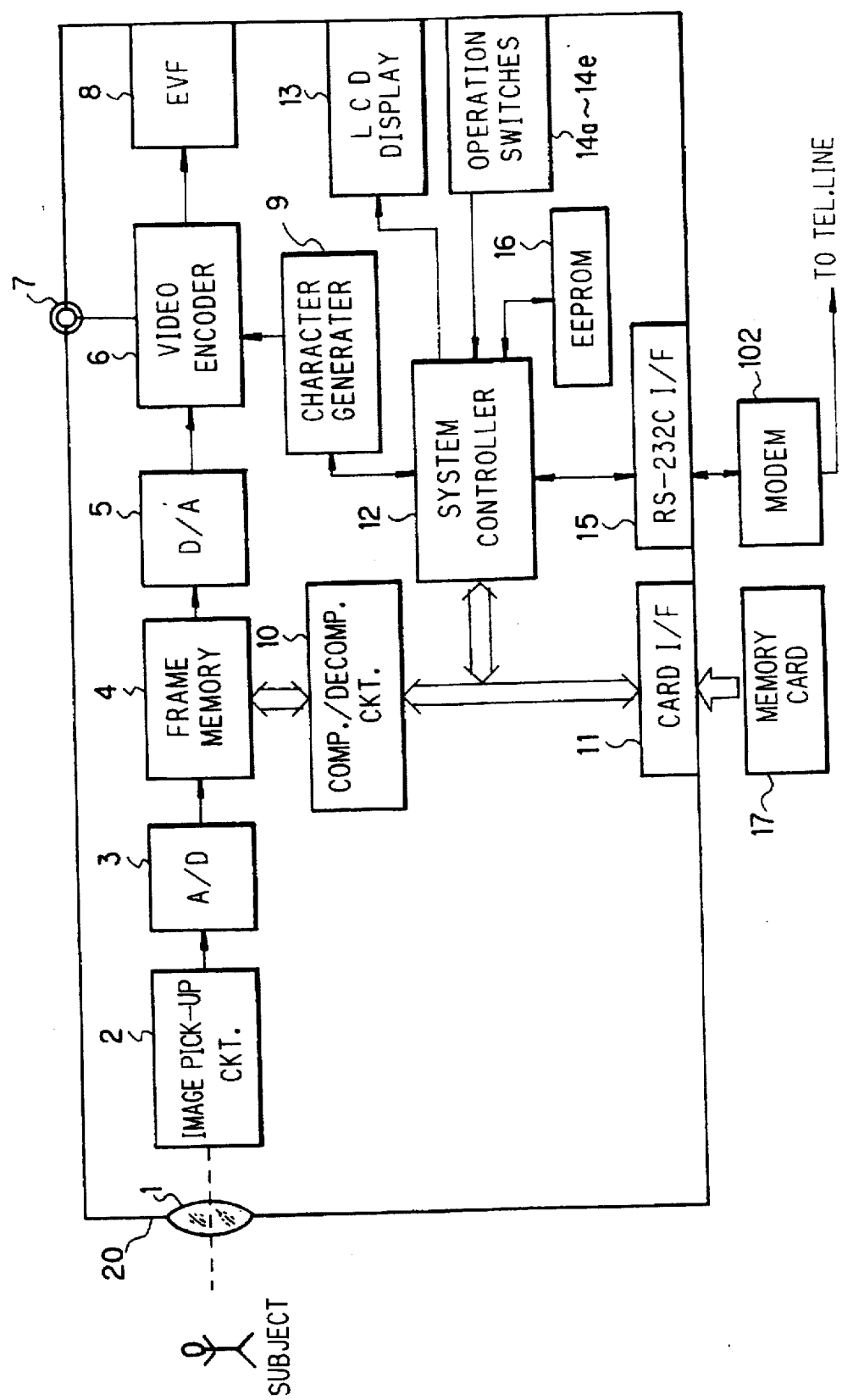
FIG. 4 is a block diagram showing a controller of the DSC 20.

FIG. 4 is a block diagram showing a controller of the DSC 20. The operation of the individual system components is controlled by a system controller 12. In the DSC 20, an image signal can be recorded in the mounted memory card 17 in response to the depression of the release switch 19 (see FIG. 1). Also, by operating the operation switches 14d and 14e it become possible to reproduce the image recording signal of an image file of an assigned frame No. on the memory card 17. In this case, the video signal is displayed as the viewfinder image in an EVF 8 and also supplied from a video signal output terminal to an external monitor.

Further, as shown in FIG. 1, the DSC 20 can transmit or receive data to or from the personal computer network host 104 via the modem 102 and telephone line 103 on the basis of a system conforming to a personal computer communication system applicable to the network organization. Further, aside from the example of FIG. 1, it is possible to realize the data communication between the DSC 20 and a personal computer or data communication between the DSC 20 and a DSC of like type.

In picking up the image, an object image is focused by an image lens 1 on an imaging element, such as CCD, provided in an image pick-up circuit 2. In the A/D converter 3 the image data from the circuit 2 is converted into digital data which is to be stored temporarily in a frame memory 4 of the image memory. The digital image data read out from the frame memory 4 is converted again in a D/A converter 5 into analog signals as video signals through a video encoder 6 and from a video output terminal 7. The video signal is displayed as the viewfinder image in the EVF 8.

When recording image data in the memory card 17, the image data is read out in a unit of blocks from the frame memory 4 for data compression by a JPEG (Joint Photographic Effect Group) method or the like in a compression/decompression circuit 10 to be coupled through a bus to a card I/F 11 as a recording signal supply means. Then, the compressed data is written in an assigned area on the memory card 17.

In reproduction, the frame No. or the like is assigned by operating the "UP" and "DOWN" switches 14d and 14e. The frame No. or the file No. is displayed on the LCD display 13. According to the assignment, a memory area in the memory card 17 is selected, and the corresponding image data is coupled through the card I/F 11 and bus to the compression/decompression circuit 10. The image data is thus subjected to the decompression process before being stored in the frame memory 4. The image data is read out again from the frame memory 4 to be converted in the D/A converter 5 into the analog data, as described before. The encoder 6 encodes the analog data to produce the video signal from the video signal output terminal 7.

Further, for the data communication the system controller 12 reads out a communication protocol (communication procedure) which has been written in an EEPROM 16 as a procedure of accessing a network, and according to this protocol the data transmission or reception is performed with respect to the personal computer network host 104 accessed by the telephone line or with a camera, a personal computer, etc. of the same type via the RS-232C I/F 15 and modem 102.

Figure 5:
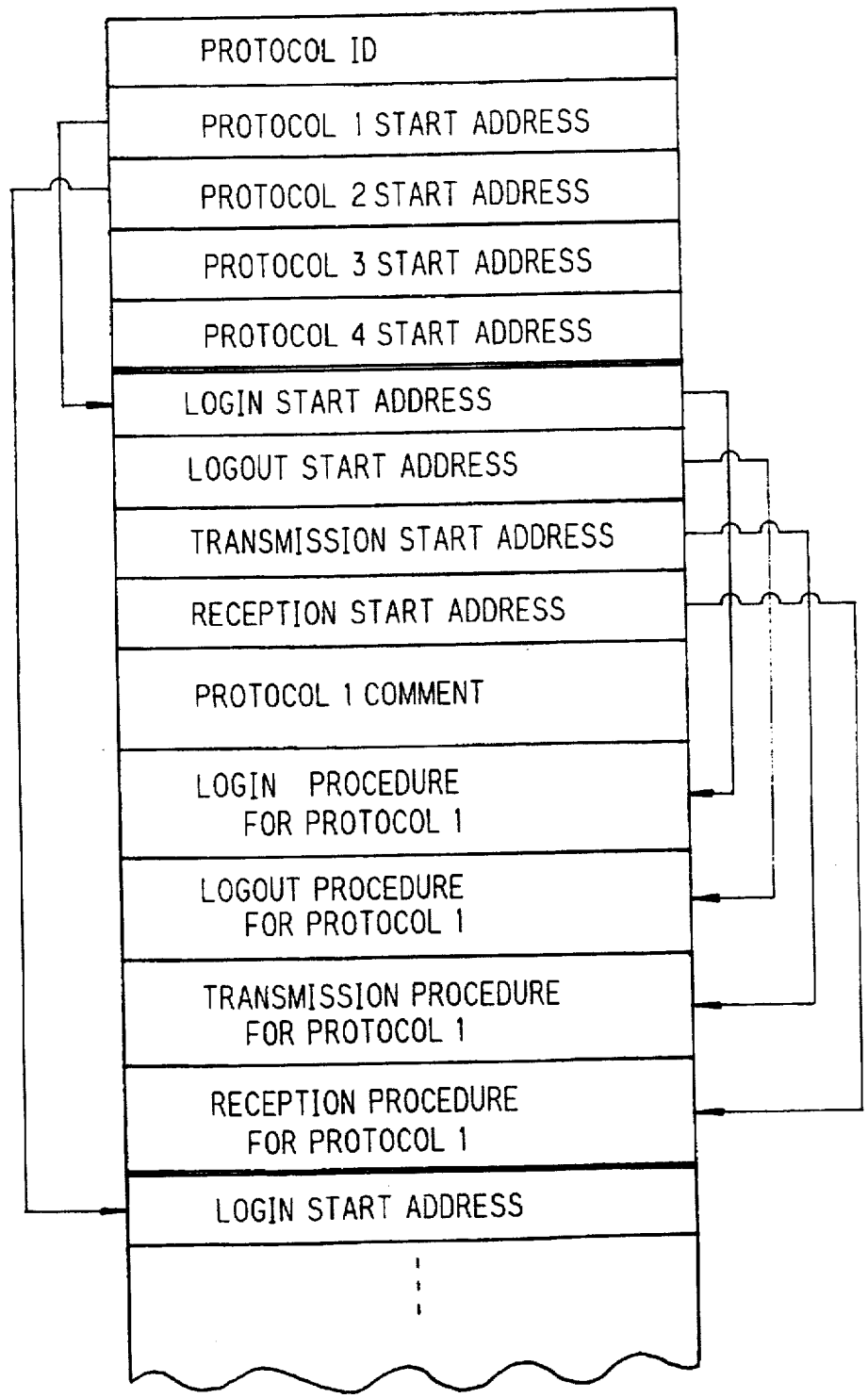
FIG. 5 shows a map of a protocol registration portion stored in the EEPROM 16 of the DSC 20.

FIG. 5 shows the map of a communication protocol registration portion stored in the EEPROM 16. The registration data file of this communication protocol constitutes a "PROTOCOL. DAT" file to be described later.

In the protocal registration portion, protocol ID is recorded at the leading address for identifying the protocol rewriting. In this embodiment, four different protocols are stored, and subsequent to the above ID addresses (pointers) of start of storage of the four protocols 1 to 4 are recorded.

Of the above four different protocols, the protocols 1 and 2 may be applied to domestic commercial services; for instance the protocol 1 may be applied to NIKKEI. MIX, and the protocol 2 to NIFTY. SERVE. As for the other protocols, the protocol 3 may be applied to DSC of the same type, and the protocol 4 to the case where a personal computer is used as a terminal.

At the protocol start address is stored a storage start address of the data body of a log procedure (protocol) for the pertinent protocol. Subsequently, a start address of logout procedure (protocol), a start address of transmission procedure (protocol), and a start address of reception procedure (protocol) are stored. Subsequently, comment information indicative of the content of the pertinent protocol is stored. The comment data, when it is displayed, is converted in a character generator 9 into character information for displaying it in the EVF 8 or on an external monitor. Subsequent to the comment information storage area the data body of each protocol is stored.

The term "login" means an operation until bringing about a state ready for writing the data in the main box 104a (FIG. 1) of the host 104 by accessing the network host 104. The term "logout" means an operation of ending the modem control after the completion of the data transfer. The transmission protocol is a write procedure for uploading data in the mail box 104a. The reception protocol is a procedure for taking the uploaded data in the main box 104a. Each protocol is converted into a file of an object file type as a description for executing processes such as the login, logout, transmission and reception.

FIG. 6 shows the correspondence between code and function of the descriptive language of the file. The code is shown hexadecimally (&H). For example, code "&H00" represents NOP, i.e., no operation. Code "&H01" is for checking whether an assigned character series can be received in an assigned time. Here, the second byte shows the assigned time, and the third and following bytes provide the retrieval character series. The leading byte shows the number of characters.

The other codes are as shown in FIG. 6. Particularly, code "&H08" is for reading out and producing a list of files among the image data files uploaded in the mail box 104a in the accessed network, the list files each being with a title "J6I" as a predetermined mark representing file attribute information. The file title "J6I" is automatically provided to the image file uploaded in the DSC 20 of this embodiment. Specifically, the title corresponds to an extender or the like in the data file.

Shown as "XMODEM" in the function is a transmission or reception protocol in an ordinary file. Shown at ER is a signal informing the modem of the completion of preparation for communication on the DSC side, and at DR is a signal showing that the modem has become capable of transmission or reception. Shown at RS is a transmission request signal, at CS is a transmission approval signal and at CD a signal which is turned upon detection of carrier from the partner modem.

FIG. 7 is a view showing a protocol description example for login process using the code in FIG. 6. In FIG. 7, the code data &H is omitted.

According to this protocol description, "On" of the signal ER informing the modem 102 of the completion of preparation of the communication on the DSC side and the signal DR showing that the modem has become capable of transmission and reception are confirmed by the code "09". Subsequently, a character series for modem initial setting is transmitted. Code "02" shows subsequent transmission of a character series. Subsequent to code "07" indicative of the number of characters, a character series "AT&F¥N3" as AT command is described to execute initial the setting of the modem 102.

For accessing the network host 104 as the object of communication, likewise code "02" and "0D" as the number of characters are described. Then, "DTφ XXXXXXXXXXX" is described for dialing number "XXXXXXXXXXX" by the tone dialing. Subsequently, for confirming the response from the partner side through the above dial processing, code "01", code "20" providing waiting time (of 32 seconds) and "02" indicative of the number of confirmed response characters are described. Further, "NET1", for instance, is described as a confirmation character series.

The protocol description data about the login, logout protocol or the transmission or reception protocol, is converted into the normal object file format to be produced at each process time.

FIG. 8 shows the map of the communication destination registration portion which is written in the EEPROM 16. The communication is executed by selecting the destinations such as destinations 1 to 4. For each communication destination, protocol distinction code, telephone No., ID, password and comment to enable the utilizer to acknowledge the communication destination are written.

FIG. 9 shows the codes to be written in the above protocol column. Code "00" is indicative of non-registration, codes "01" to "04" are respectively indicative of the protocols 1 to 4 shown in FIG. 5 and code "0F" is indicative of the application of the procedure (for instance "PROTOCOL. CTL") recorded in a storage medium 17 or the like. This protocol has the same data structure as that on the EEPROM 16 shown in FIG. 5. Code "0E" applies to the case of manually assigning the telephone No. or the like. The telephone No., ID, comment, etc. other than the protocol type in FIG. 8 are stored in ASCII codes.

Now, a communication protocol write-in operation will be described by using the EVF or a monitor screen shown in FIGS. 10 to 12. On these screens, character data are displayed via the character generator 9 such as in superimposition on the presently reproduced image data.

By depressing the "REGISTER" switch 14b, the registering operation is started, and a registration menu is displayed on the EVF 8 or the monitor shown in FIG. 10. The cursor is then moved to the position of the communication destination registration or the protocol registration by operating the "UP" and "DOWN" switches 14d and 14e, and either process is assigned by operating the "EXECUTE" switch 14c.

When the protocol registration is assigned, "IN PROTOCOL REGISTRATION" is displayed on the monitor or the like as shown in FIG. 11. Then, "PROTOCOL DAT" as protocol data file on the medium is retrieved. When the file is retrieved, the file validity is checked. In effect, the check is done as to whether valid ID has been recorded in the file. If the file is found to be valid, it is written in the EEPROM 16, and the original display appears. By supplying the above file "PROTOCOL. DAT" to the EEPROM 16 in this way, it is possible to switchingly register a protocol which is not included in the four different protocols in the protocol registration portion shown in FIG. 5.

Now, a communication destination registration operation will be described.

When a communication destination registration is selected and assigned in a registration menu in FIG. 10 with the "UP" and "DOWN" switches 14d and 14e and "EXECUTE" switch 14c, communication destination registration data shown in FIG. 12 is displayed. Then, the communication destination Nos. 1 to 4 on the communication destination registration portion map shown in FIG. 8 are displayed together with cursor. The No. is switched successively with the "UP" and "DOWN" switches 14d and 14e, and the communication destination is assigned with the "EXECUTE" switch 14c. Thereafter, the cursor is moved to the communication destination comment display portion for the writing of a comment.

As for the character assignment, characters "0" to "9" and "A" to "Z" are displayed circulatedly in response to the operation of the "UP" and "DOWN" switches 14d and 14e, and the selected characters are assigned. Thereafter, assignment of protocol "01", etc. is made. At this time, the network name is also displayed. Then, telephone No. assignment is made. Specifically, assignment is made with respect to tone line and pulse line, and then a desired numeral is assigned as telephone No. through the circulation of the displayed numerals "0" to "9", etc. Then, ID and password are assigned at the same time. When all the assignments are ended, the original display is returned.

When selecting the other items than the above items, the display character or the like at the cursor position is displayed circulatedly by operating the "UP" and "DOWN" switches 14d and 14e, and when desired characters or the like are displayed, they are assigned by operating the "EXECUTE" switch 14c.

Figure 13:
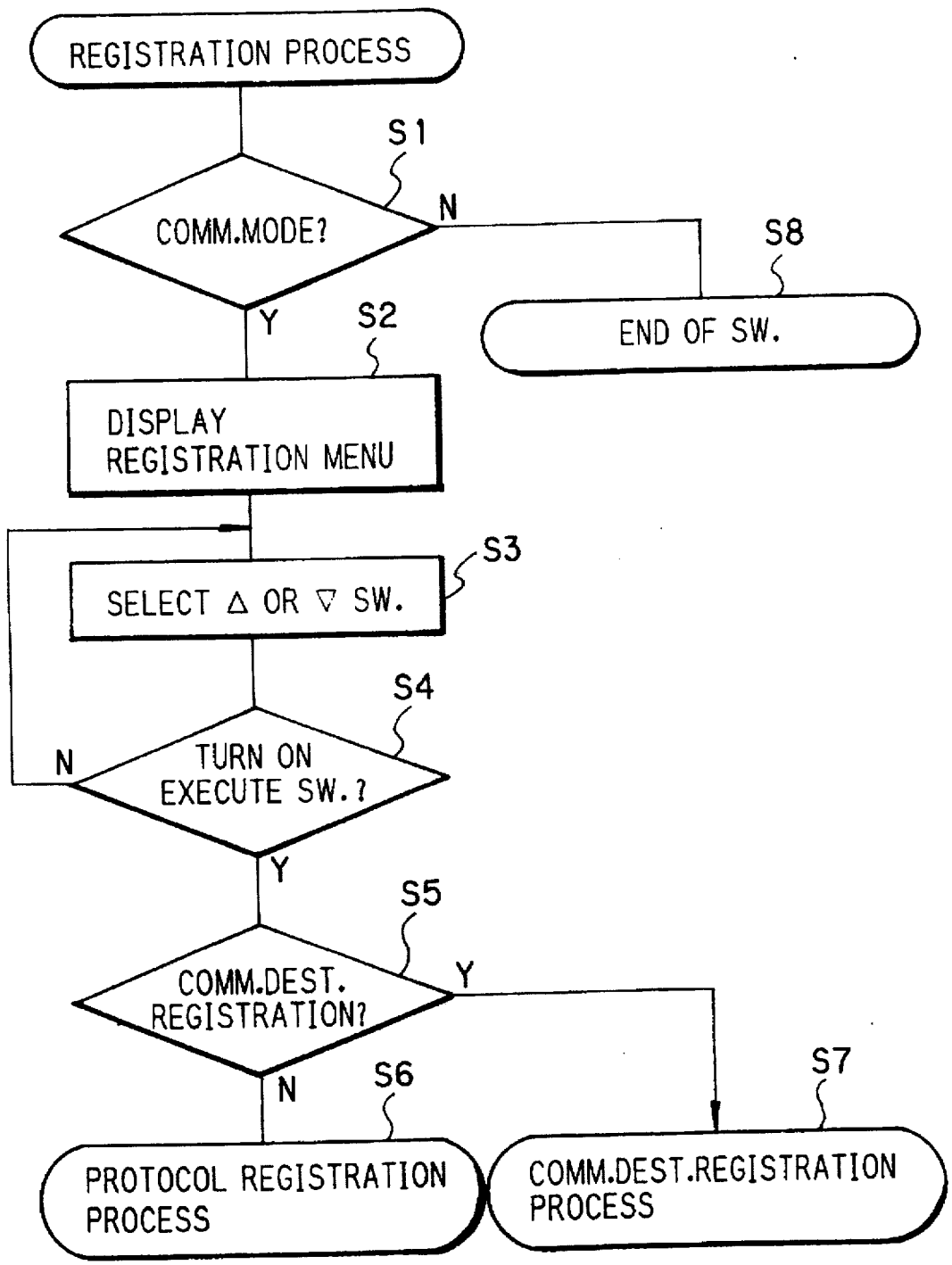
FIG. 13 to 15 show flow charts illustrating "registration process", "protocol registration process" and "communication destination registration process"

Now, the method of the above protocol registration will be described with reference to the flow charts of FIGS. 13 to 15 and the displays described above. In response to the operation of the "REGISTER" switch 14b, a sub-routine called "registration process" shown in FIG. 13 is called. A check as to whether the communication mode prevails is then made (step S1). If the communication mode prevails, the registration menu shown in FIG. 10 is displayed on the monitor or the like (step S2). The registration type selection is made with the "UP" and "DOWN" switches 14d and 14e (step S3). Then, after turning on the "EXECUTE" switch 14c (step S4), a check as to whether the assignment is of the protocol registration or of the communication destination registration is made (step S5) to call a sub-routine "protocol registration process" (step S6) or a sub-routine "communication destination registration process" (step S7).

Figure 14:
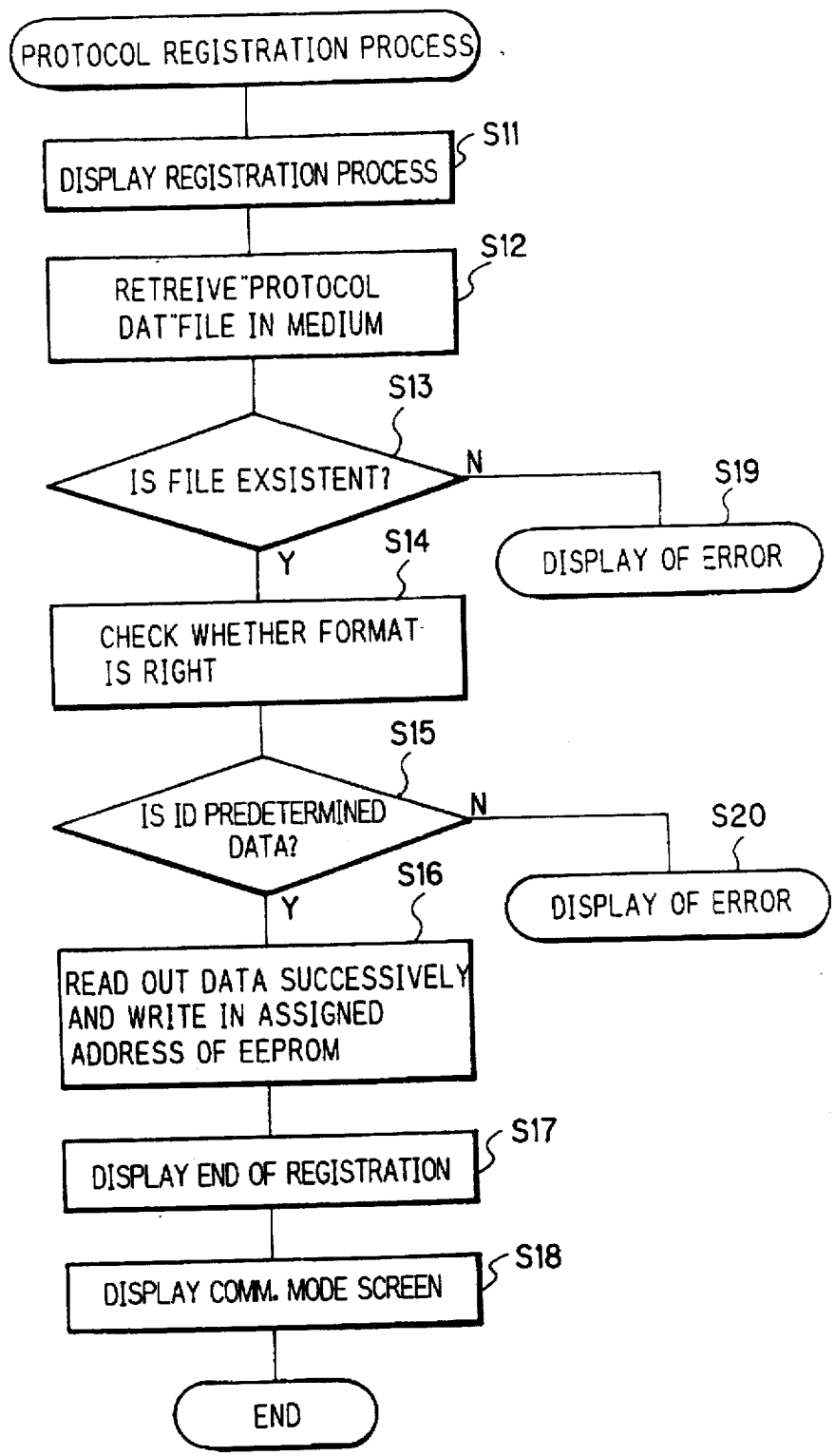

FIG. 14 is a flow chart of the sub-routine "protocol registration process". This routine is for rewriting the protocol registration portion shown in FIG. 5. First, the protocol registration process shown in FIG. 11 is displayed on the monitor or the like (step S11). Then, a file "PROTOCOL. DAT" written in the memory card 17 is retrieved (step S12). When the file can be retrieved (step S13), a check is made as to whether the format is right (steps S14 and S15). This check is done by checking the ID. Next, the data in the file are read out successively and written in assigned addresses in the EEPROM 16 (step S16). After the writing-in, the completion of the registration, the communication mode display is provided, thus bringing an end to this routine (steps S17 and S18).

Figure 15:
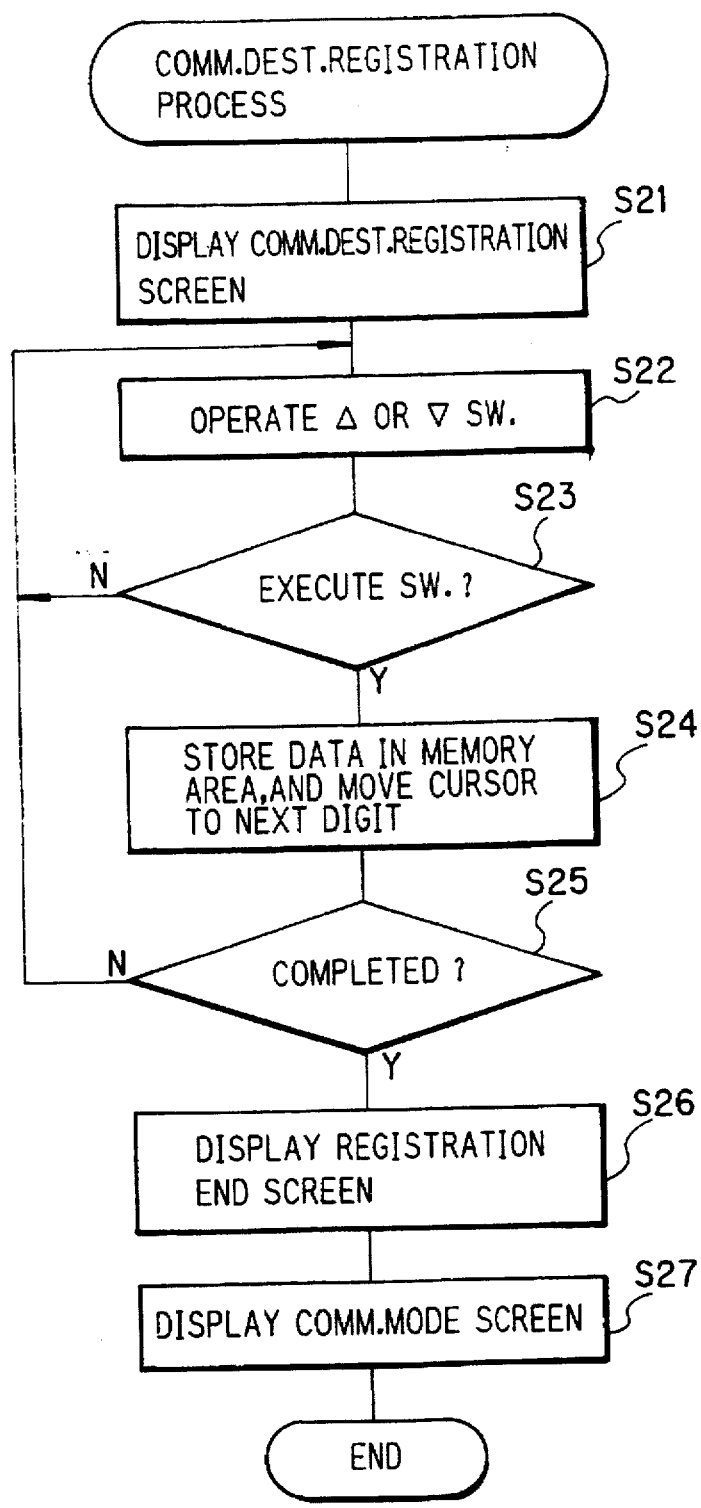

FIG. 15 is a flow chart of the sub-routine "communication destination registration process". This routine is a process for registering the communication destination in the communication destination registration portion map shown in FIG. 8. First, the communication destination registration as shown in FIG. 12 is displayed on the monitor or the like (step S21). Then, the communication destination Nos. 1 to 4 with cursor are switched by operating the "UP" and "DOWN" switches 14d and 14e, and then the assignment is executed with the "EXECUTE" switch 14d.

Next, the comment concerning the communication destination is displayed through character circulation by operating the "UP" and "DOWN" switches 14d and 14e. Then, the input of protocol code, telephone No., ID, password, etc. is executed with the change of the displayed digits (steps S23 and S24). After the registration, the screen is changed to the screen of the end of registration, and the communication mode screen is returned, thus bringing an end to this routine.

Now, an operation of executing the transmission or reception of the image data for the communication destination that has been registered in the above method will be described.

Figure 16:
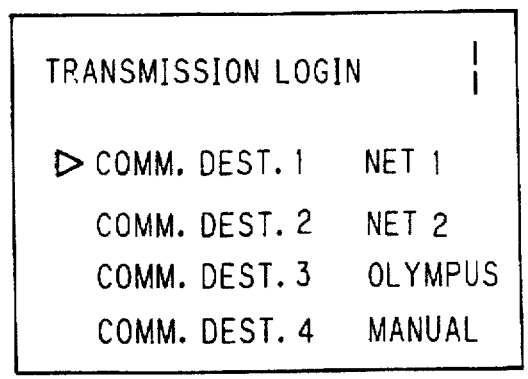

First, the routine of the image file transmission will be described with reference to FIGS. 16 to 19 showing a screen. By switching the slide switches 14g and 14f to the communication side and the transmission side, respectively, and turning on the "POWER" switch 14a, a transmission login screen showing communication destination in FIG. 16 is displayed on the monitor or the like. The transmission login screen in FIG. 16 has the display corresponding to FIG. 8, i.e., display of the communication destination No. with cursor and the comment thereof which is the communication destination network name, for instance, NET1 or the like. Here, the transmission login screen is made in superimposition on the currently reproduced transmission image. The right upper number is the currently reproduced frame No. In this state, the communication destination is assigned with the "EXECUTE" switch 14c by moving the cursor with the "UP" and "DOWN" switches 14d and 14e. In consequence, a login operation is executed according to the registered protocol, and the main box 104a in the communication destination is accessed.

Figure 17:
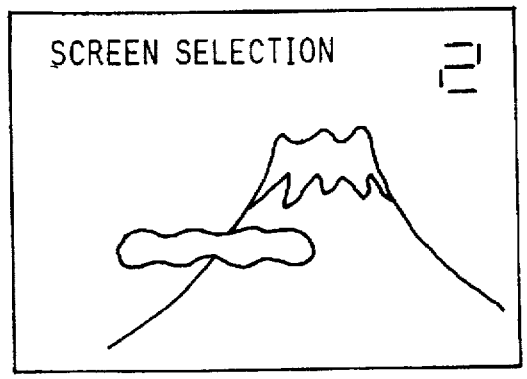
Figure 18:
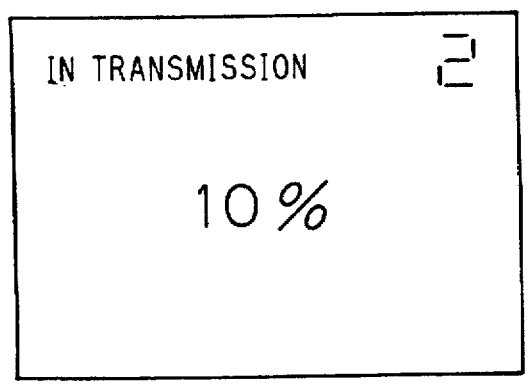

When the accessing is completed, the screen on the monitor or the like is changed to a screen selection display (FIG. 17). The frame to be transmitted is displayed, as shown in FIG. 17, through changing the reproduced frames by operating the "UP" and "DOWN" switches 14d and 14e. Then, the "EXECUTE" switch 14c is depressed, whereby the image data of the selected frame is uploaded in the mail box 104a according to the transmission protocol, for instance, XMODEM protocol. During this transmission routine, "IN TRANSMISSION" is displayed as shown in FIG. 18, that is, the transmission frame No. and the present transmission data amount (%) are displayed. When the data transmission is ended, "J6I" is added as the file title to the uploaded image file. The image data is transmitted repeatedly by a number of times corresponding to the number of necessary transmission frames.

For completion of the transmission, by selecting "END" corresponding to the final frame by operating the "UP" and "DOWN" switches 14d and 14e and depressing the "EXECUTE" switch 14c, the logout routine is executed according to the logout protocol. That is, the modem control is ended, and the communication destination selection screen shown in FIG. 16 is returns.

In the above image data transmission operation, the transmission is made repeatedly frame by frame while observing the reproduced screen. In a modification, a plurality of frames to be transmitted may be marked by operating the "UP" and "DOWN" switches 14d and 14e, and the image data of the marked frames may be automatically selected and transmitted continuously. The data to be transmitted may be the image data stored in the mounted memory card or the speech data, the control data, etc. as well as the image data picked up with the DSC 20.

Figure 20:
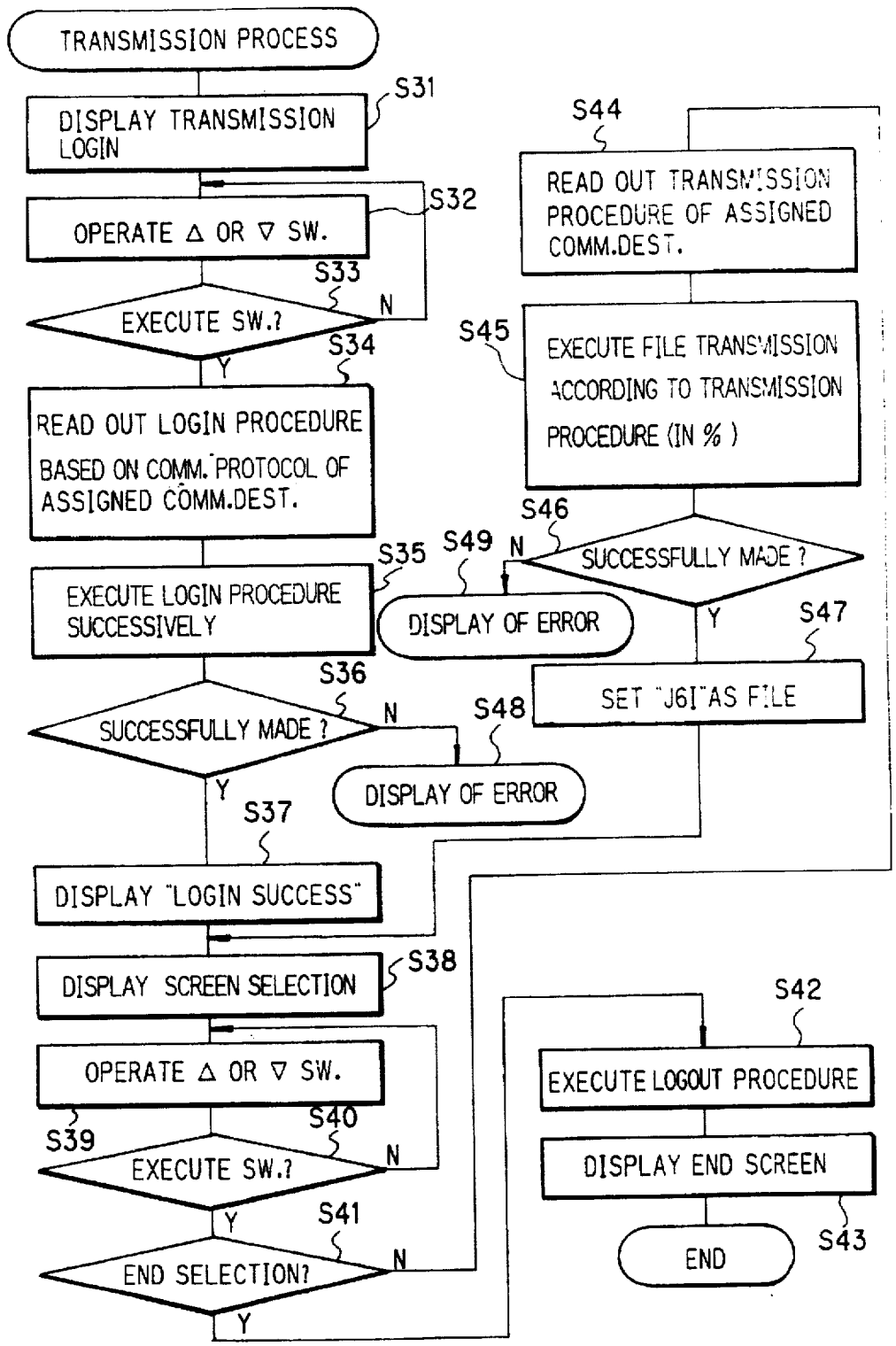
FIG. 20 shows a flow chart illustrating "transmission process"

The above image file transmission routine will be described again with reference to a flow chart. When the data transmission setting is made, a sub-routine "transmission process" shown in FIG. 20 is called, and transmission login screen (see FIG. 16) is displayed on the monitor or the like (step S31). The communication destination is then assigned by operating the "UP" and "DOWN" switches 14d and 14e or operating the "EXECUTE" switch 14c (steps S32 and S33). Next, a login procedure based on the communication protocol of the assigned communication destination is read out and executed successively (steps S34 and S35).

After the login processing, a check as to whether the login has been successful is made (step S36). If the login has not been successful, an error message is displayed to bring an end to the routine (step S48). If the login has been successful, this content is displayed (step S37), and then the selection of screen with superimposition of reproduced image screen as shown in FIG. 17 is displayed (step S38). The transmission frame No. assignment is made by operating the "UP" and "DOWN" switches 14d and 14e or operating the "EXECUTE" switch 14c while observing the reproduced screen (steps S39 and S40).

Figure 19:
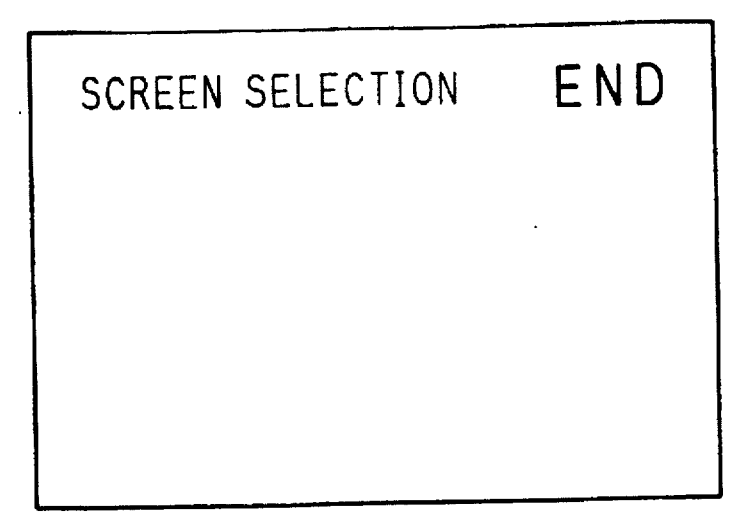

If the end of data transmission is not shown, the read-out of the procedure of the file transmission to the assigned communication destination is executed (step S44). The file transmission is executed in the above procedure, and the ratio between the image data being transmitted and the data amount having been transmitted up to now is displayed (see FIG. 18). Then, whether the transmission has been successful is checked. If the transmission has not been successful, this content is displayed to bring an end to the routine. If the transmission has been successful, "J6I" is set as the title of the transmission file uploaded in the main box 104a (step S47). Next, the routine goes back to the step S38 to select the frame to be transmitted again. Thereafter, when "END" in FIG. 19 is displayed with the end of transmission of the final frame, it is determined that the transmission has been ended (step S41). Then, the logout procedure is executed (step S42) to produce an end display (step S43), thus bringing an end to the routine.

Now, a reception routine of downloading a file having been uploaded in the mail box 104a to be taken into the DSC 20 will be described with reference to the screens shown in FIGS. 21 to 23.

By switching the slide switches 14g and 14f to the communication side and the reception side, respectively, and turning on the "POWER" switch 14a, a reception login screen indicating the selected communication destination is displayed on a monitor or the like as shown in FIG. 21.

The reception login screen is what is obtained by changing the transmission to the reception in the screen of FIG. 16, and the selection of the communication destination is made in the same way. When the communication destination is assigned, the login operation is executed according to the registered protocol, and the mail box 104a in the communication destination is accessed.

When the accessing is completed, files with file title "J6I" are selected from the file list in the main box 104a, and their table is taken in. Then, a mail list as shown in FIG. 22, including the number of files for the pertinent file, the number of total bytes, etc., is displayed. The illustrated example of screen shows that three files have been uploaded in the main box 104a and that the total byte number of the files is 128 k bytes. Then, by depressing the "EXECUTE" switch 14c the reception of the files with file title "J6I" in the above table is started according to the registered reception protocol.

During the reception process, a screen "IN RECEPTION" as shown in FIG. 23 is provided. This screen has the file No. of the file presently being received and a file name which has been automatically provided at the time of the reading, for instance a serial title name "DS000001.J6I" with the title name "J6I" applied as an extender. Further, read-out state of each file is displayed in terms of the received data amount (in %).

The successfully received files are automatically deleted from the mail box 104a in the host. In a modification, it may be arranged such that whether to execute the deletion is asked from the host side.

When the reception has been ended, the logout processing is executed according to the registered protocol to complete the modem control and the original communication destination selection screen (FIG. 21) is returned.

In this previously described processing, the execution of the routine is instructed by depressing the "EXECUTE" switch 14c. Alternatively, it is possible to arrange such that the execution of the routine is entered by depressing the "RELEASE" switch 19 which is provided in an upper portion of the camera.

Further, while in this embodiment the title "J6I" is provided to all the files transmitted by the DSC 20, it is alternatively possible to deal with title names as meaningful ones such that they are buffered in the system controller 12 for writing in the received image data in the header.

Figure 24:
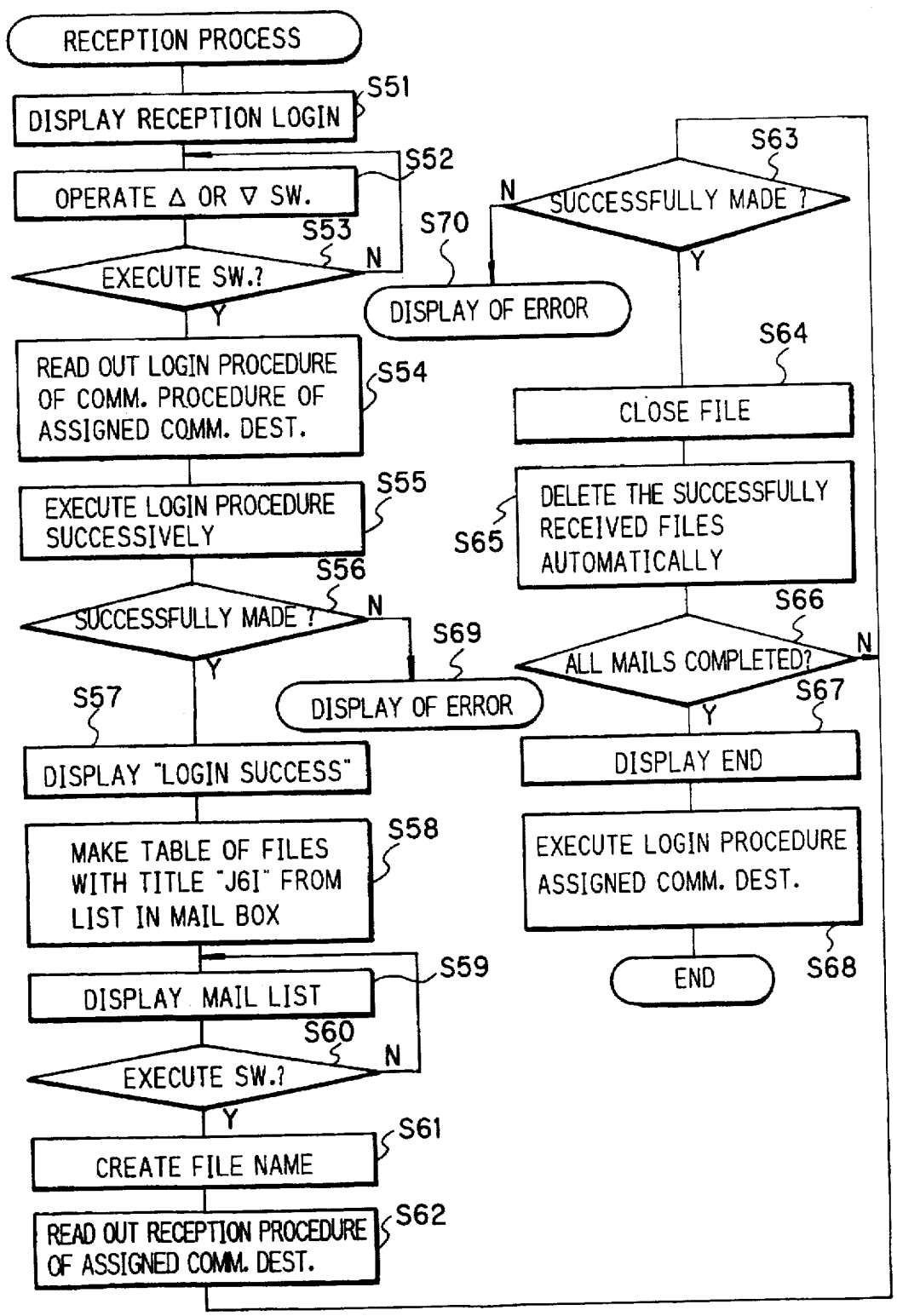
FIG. 24 shows a screen of a flow chart illustrating "reception process"

The above image file reception routine will be described again. When the data reception is set, a sub-routine "reception process" shown in FIG. 24 is called, and the reception login (see FIG. 21) is displayed on the monitor or the like (step S51). The communication destination is assigned by operating the "UP" and "DOWN" switches 14d and 14e or operating the "EXECUTE" switch 14c. The login procedure based on the communication protocol in the assigned communication destination is read out and executed successively (steps S54 and S55).

After the login process, a check is made as to whether the login has been successful (step S56). If the login has not been successful, this effect is displayed to bring an end to the routine (step S69). If the login has been successful, the content is displayed (step S57), a table of files with the title "J6I" is produced on the basis of the file list in the mail box 104a, and a mail list as shown in FIG. 22 is displayed (steps S58 and S59).

With confirmation of the depression of the "EXECUTE" switch 14C (step S60), the transmission file name is automatically created (step S61). Further, the read-out of the files with the title "J6I" is executed according to the assigned communication destination reception procedure (step S62). Then a check as to whether it is successful (step S63). If successful, the file is closed (step S64), and the received files in the mail box 104a are deleted automatically (step S65). The above reception routine is repeated until the end of reception of all the files with the title "J6I" in the mail box 104a (step S66). When the reception is ended, end display is made (step S67), and the assigned communication destination logout procedure is executed (step S68), thus bringing an end to the routine.

As described above, with the DSC 20 of this embodiment, the transmission and reception of the image data or the like in conformity to an inter-personal computer communication system is possible without use of any personal computer but by using only DSC units and small type modems.

In addition, since the DSC in the embodiment has means for registering procedure of accessing the personal computer communication network, it is possible to cope with the modifying of network protocols. Further, it is possible to register telephone No., ID, password, etc. with respect to a plurality of communication destinations, thus permitting automatic login with respect to the network.

Furthermore, the network mail box can be automatically accessed, thus permitting the network to be readily accessed. Since the title, for instance "J6I" is assigned at the time of the uploading in the mail box, it is possible to easily discriminate the image data. It is also possible to download the image data by selecting, for instance, "J6I" as title, only intended data may be downloaded. Further, since accessing procedure recorded on the storage medium can be executed, it is possible to execute various access procedures freely.

Now, a second embodiment of the DSC according to the present invention will be described.

Figure 25:
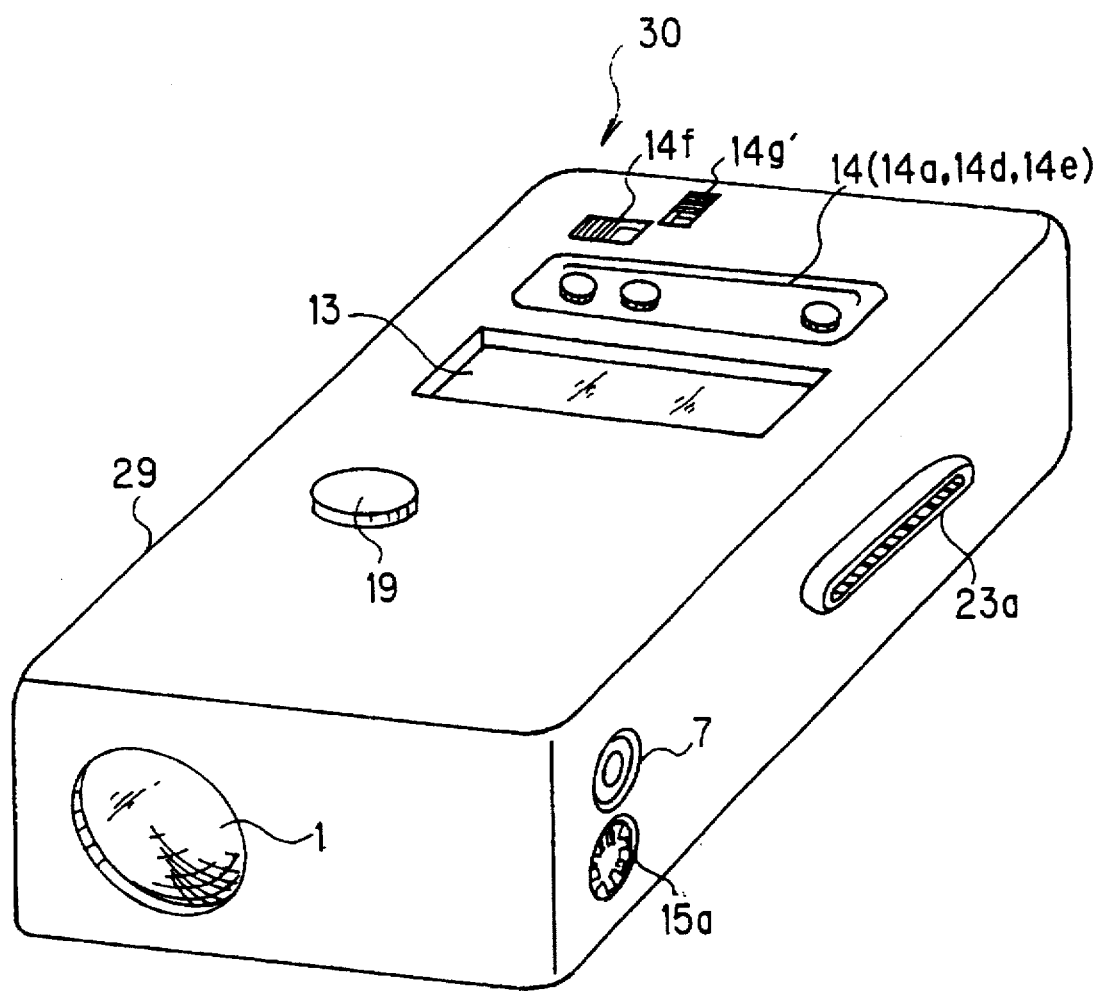
FIG. 25 is a perspective view showing the second embodiment of the DSC 30 according to the present invention.
Figure 26:
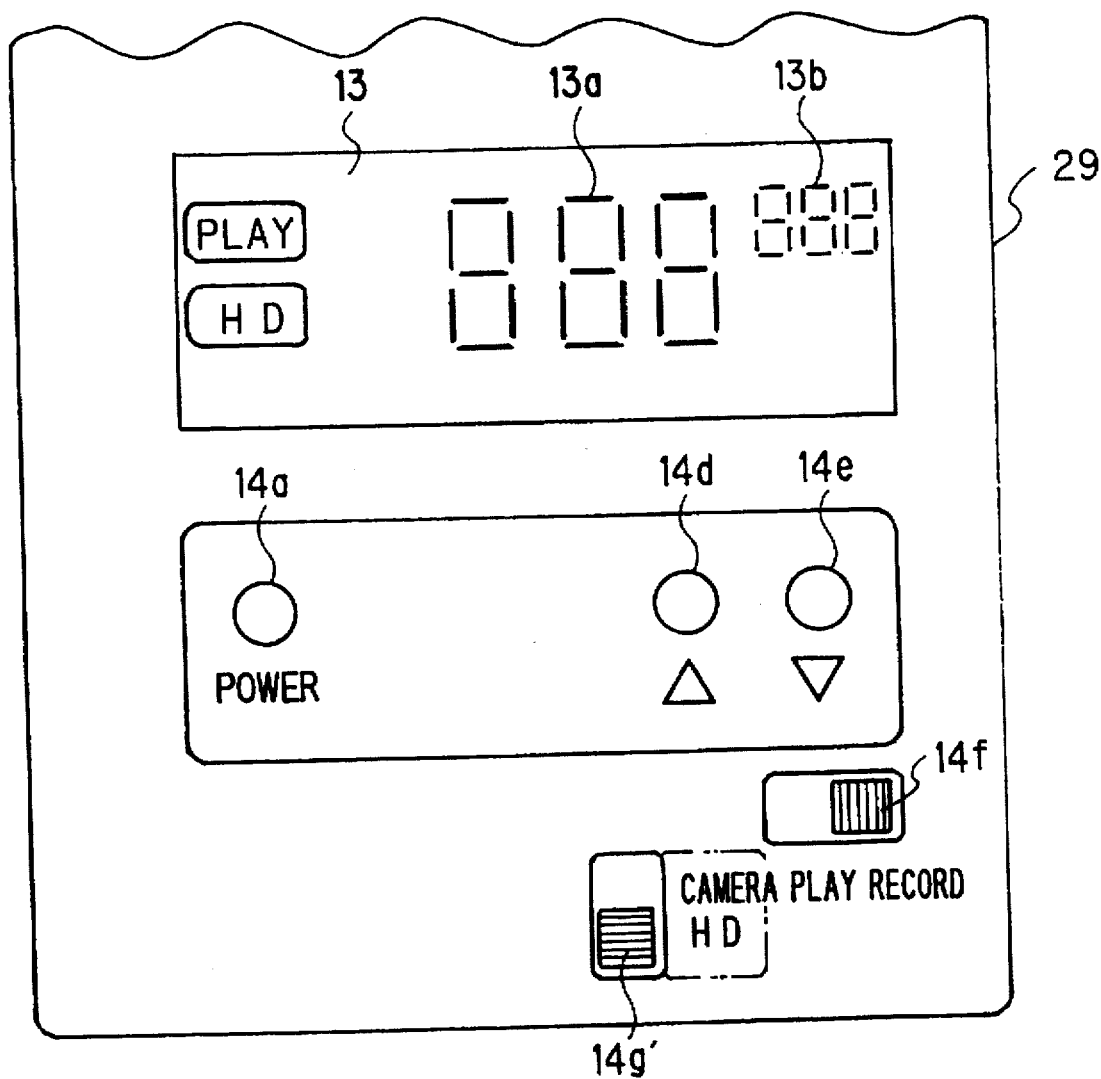
FIG. 26 is an enlarged-scale view showing a display 13 and an operation switches 14 in the DSC

This DSC is an electrophotographic system, in which a HD (hard disk) is provided as large capacity storage means in the camera. FIG. 25 is a perspective view showing the second embodiment of the DSC 30 according to the present invention applied to an image recorder. FIG. 26 is an enlarged-scale view showing a display 13 and an operation switches 14 in the DSC 30.

The DSC 30 uses the HD as data storage medium of comparatively large capacity as noted above and includes, in addition to RS-232C, means of communication with the outside, i.e., a SCSI (Small Computer Systems Interface) 23 (see FIG. 27) as a high speed parallel interface.

In the DSC 30, as shown in FIG. 25, while a image pick-up lens 1, a trigger switch 19, etc. are provided on camera housing 29, an SCSI connector 23a is provided in place of the memory card insertion slit in the first embodiment on one side of the housing. Further, the display 13, as shown in FIG. 26, displays a "PLAY" when a play mode other than a record mode is set, and also displays "HD" when a HD mode to be described later is set. Seven-segment display sections 13a and 13b are the same as those in the first embodiment.

As operation switches 14, a "POWER" switch 14a and "UP" and "DOWN" switches 14d and 14e are provided. With the DSC 30, it is possible to set a camera mode, in which the DSC is used as a camera for normal recording and reproduction, and an HD mode, in which the DSC is used as an HD unit for only transmission and reception of signals with respect to the external units. For mode switching, a slide switch 14g' is provided. A slide switch 14f switches between the recording and play modes in the camera mode.

Figure 27:
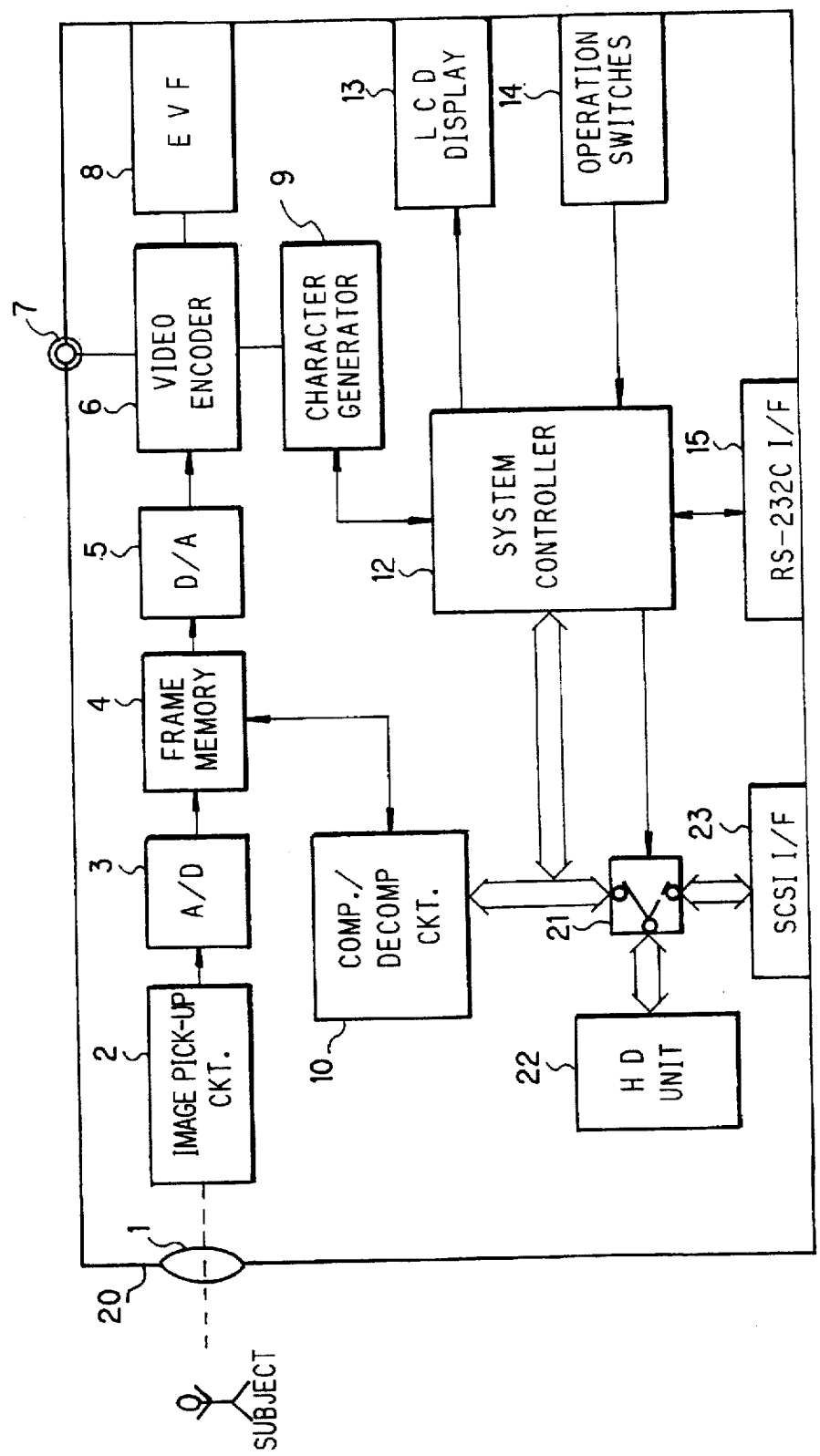
FIG. 27 is a block diagram showing a controller in the DSC 30.

FIG. 27 is a block diagram showing a controller in the DSC 30. Like the first embodiment of the DSC 20, the operation of individual components is controlled by a system controller 12. This embodiment is different from the first embodiment of the DSC 20 in that it includes the HD unit 22 and an SCSI I/F 23 for transmission and reception of signals between the HD unit 22 and the external unit. Further, a switch element 21 switches a bus of the HD unit 22 to be connected to an internal compression/decompression circuit 10 for the imaging signal or to the SCSI I/F 23. The switch element 21 is switched in an interlocked relation to the mode-switching slide switch 14g'.

With the switch element 21 switched to the side of the compression/decompression circuit 10, the DSC 30 functions as a camera. With the switch element 21 switched to the side of the SCSI I/F 23, on the other hand, the DSC functions as the normal HD unit, permitting transfer of a large amount of image data having been picked up with camera to the external unit and taking in a large amount of image data from the external unit via the SCSI I/F 23. In this switching, either side is selected independently.

Figure 28:
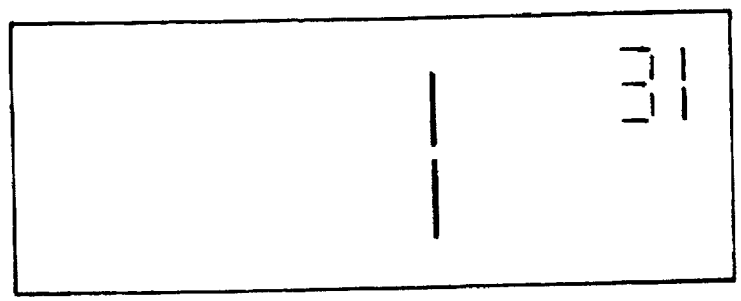
FIG. 28 shows the display 13 in this embodiment of the DSC 30.

FIG. 28 shows the display 13 in this embodiment of the DSC. The illustrated state of screen is obtained with the slide switch 14f switched to the recording mode side and with the slide switch 14g' switched to the camera mode side. In the illustrated state of display, it is shown that picking-up is being made with the first frame and that there are 31 residual frames.

Figure 29:
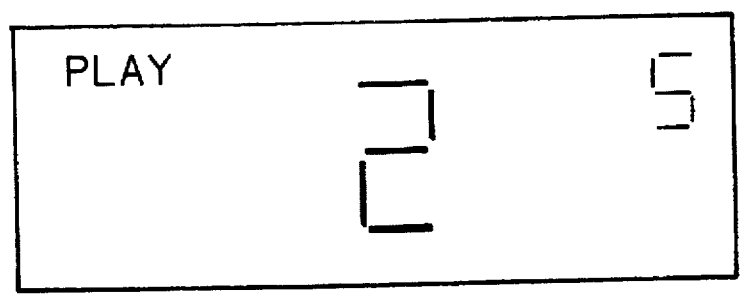
FIG. 29 shows a state of screen in the camera mode but with the slide switch 14f switched to the play mode side.

FIG. 29 shows a state of the screen in the same camera mode but with the slide switch 14f switched to the play mode side, and "PLAY" is displayed. Here, it is shown that the second frame is presently being reproduced and that there are 5 frames capable of reproduction.

Figure 30:
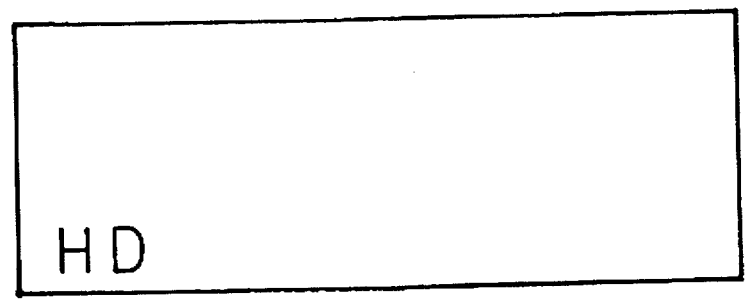
FIG. 30 shows a state of screen with the slide switch 14g' switched to the HD mode side.

FIG. 30 shows a state of the screen with the slide switch 14g' switched to the HD mode side. Here, the "HD" is displayed, and the DSC does not function as a camera.

Figure 31:
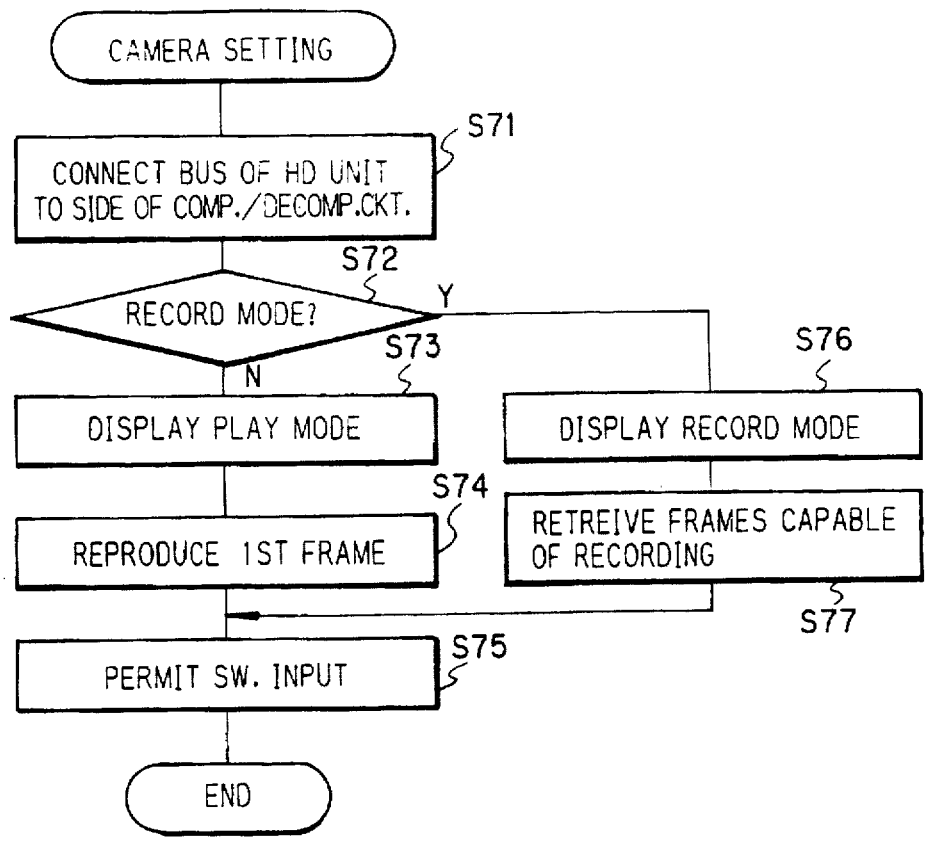
FIG. 31 is a flow chart illustrating a routine when the camera mode of the DSC 30 is set.

FIG. 31 is a flow chart illustrating a routine when the camera mode of the DSC 30 is set. This sub-routine is called through the assignment of the camera mode by operating the slide switch 14g'. Then, the bus of the HD unit 23 is switched so as to be connected to the side of the compression/decompression circuit 10 (step S71). Then, the state of the slide switch 14f is checked. If the recording mode has been selected, the routine jumps to step S76. If the play mode has been selected, the routine jumps to step S73.

In step S76 the recording mode is displayed. Then, recordable frames are retrieved (step S77), and the routine then jumps to step S75 to await switch input. In the step S73, "PLAY" is displayed. In step S74, the first frame is reproduced, and likewise the routine goes to step S75. In the step S75, the input from the "POWER" switch 14a and "UP" and "DOWN" switches 14d and 14e is permitted.

Figure 32:
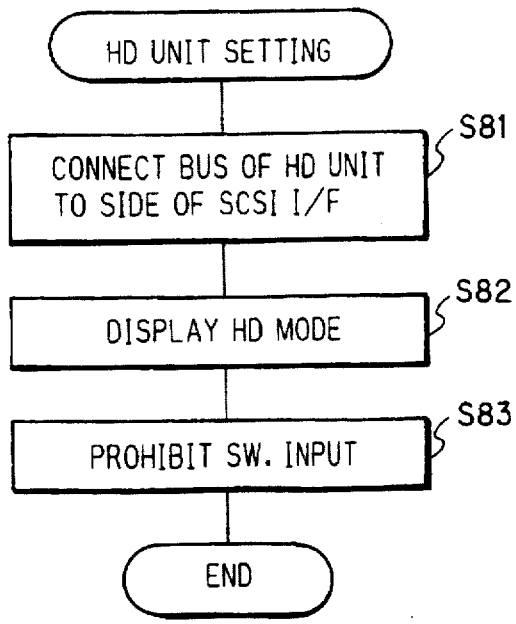
FIG. 32 is a flow chart showing a routine which is executed when the HD mode of the DSC 30 is set.

FIG. 32 is a flow chart showing a routine which is executed when the HD mode of the DSC 30 is set. In this routine, the bus of the HD unit 23 is first switched to be connected to the side of the SCSI I/F 23 (step S81). Then, "HD" is displayed (step S82), and a state of inhibiting input from switches other than the "POWER" switch 14a and slide switch 14g' is brought about.

As has been described, with the setting of the HD mode, this embodiment of the DSC 30 functions as the HD unit, i.e., as a peripheral unit. Thus, it is possible to utilize the DSC as a unit which is perfectly equivalent to a universal HD unit with SCSI. In this case, the input from switches other than the "POWER" switch 14a and the slide switch 14g' is inhibited in the step S83 in FIG. 32, and thus it is possible to prevent erroneous operation of the DSC.

Figure 33:
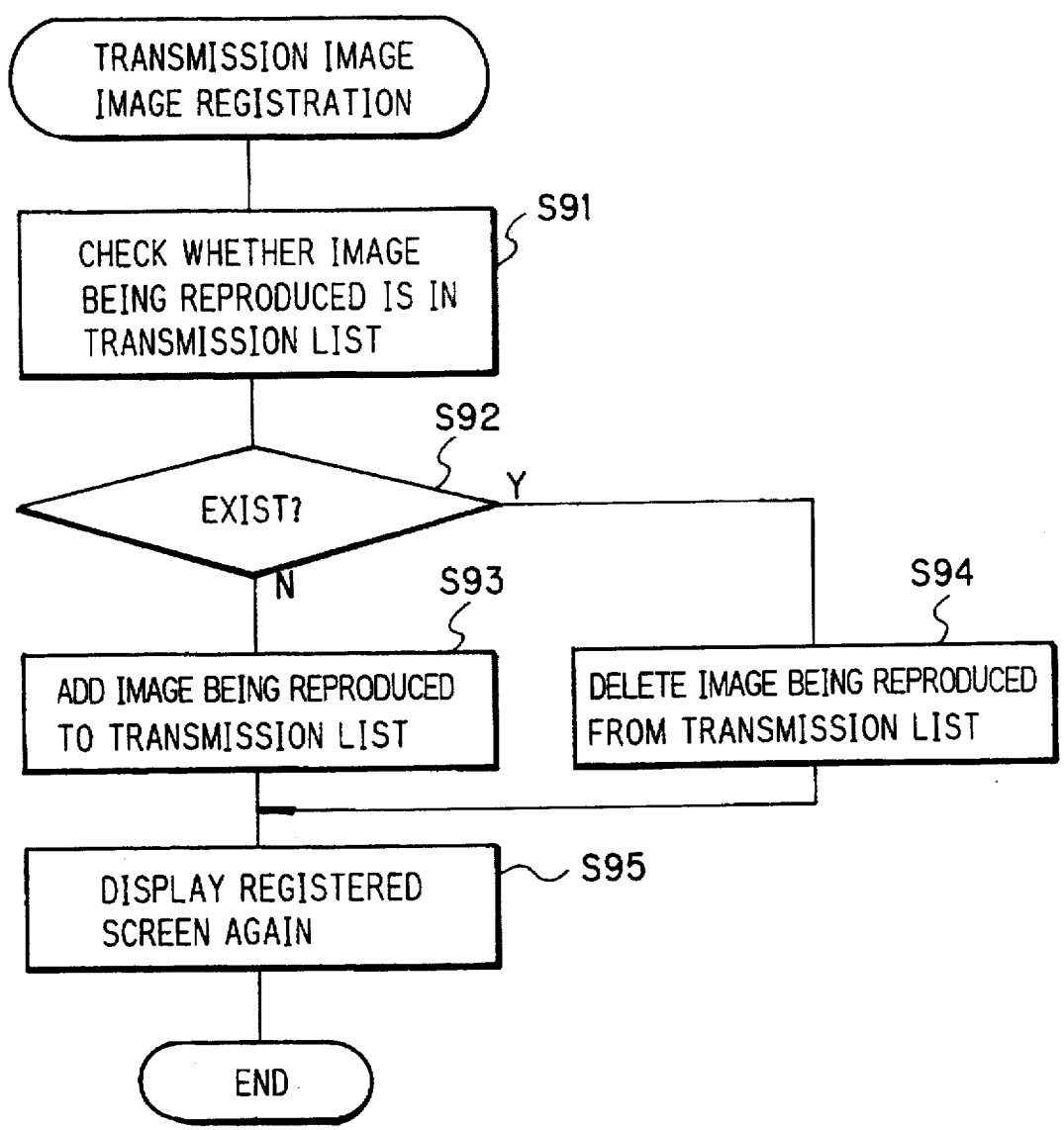
FIG. 33 shows a transmission image registration procedure of the embodiments.

The transmission image registration procedure of the foregoing embodiments will be described with reference to FIG. 33. This routine is executed as a sub-routine in response to the depression of a transmission image registration switch when the system controller 12 of the DSC 20 is in a button monitoring state. In the transmission mode, the "EXECUTE" switch 14d in the first embodiment is assigned to the registering operation.

In step S91, a check is made as to whether the image being reproduced is in the transmission list. The image to be transmitted is registered by depressing the "EXECUTE" switch 14d in the transmission mode. In the transmission mode, the image on the medium is in a state of reproduction, and image desired to be transmitted can be selected by observing it on the monitor. Frames are fed while watching image being reproduced, and the "EXECUTE" switch 14d is operated when an image desired to be transmitted is displayed.

The image to be transmitted is registered in the system controller 12, and a check is made as to whether the image has already been registered in the transmission list. If it is determined in step S92 that the selected image is not in the transmission list, the routine goes to step S93. In step S93, the image being reproduced is added to the transmission list. If it is determined in the step S92 that image being reproduced is in the transmission list, the routine goes to step S94. In step S94, the image being reproduced from the transmission list is deleted. When step S93 or S94 is ended, step S95 is executed, in which the registered screen is displayed again. The registered screen will be described in detail with reference to FIG. 35.

Figure 34:
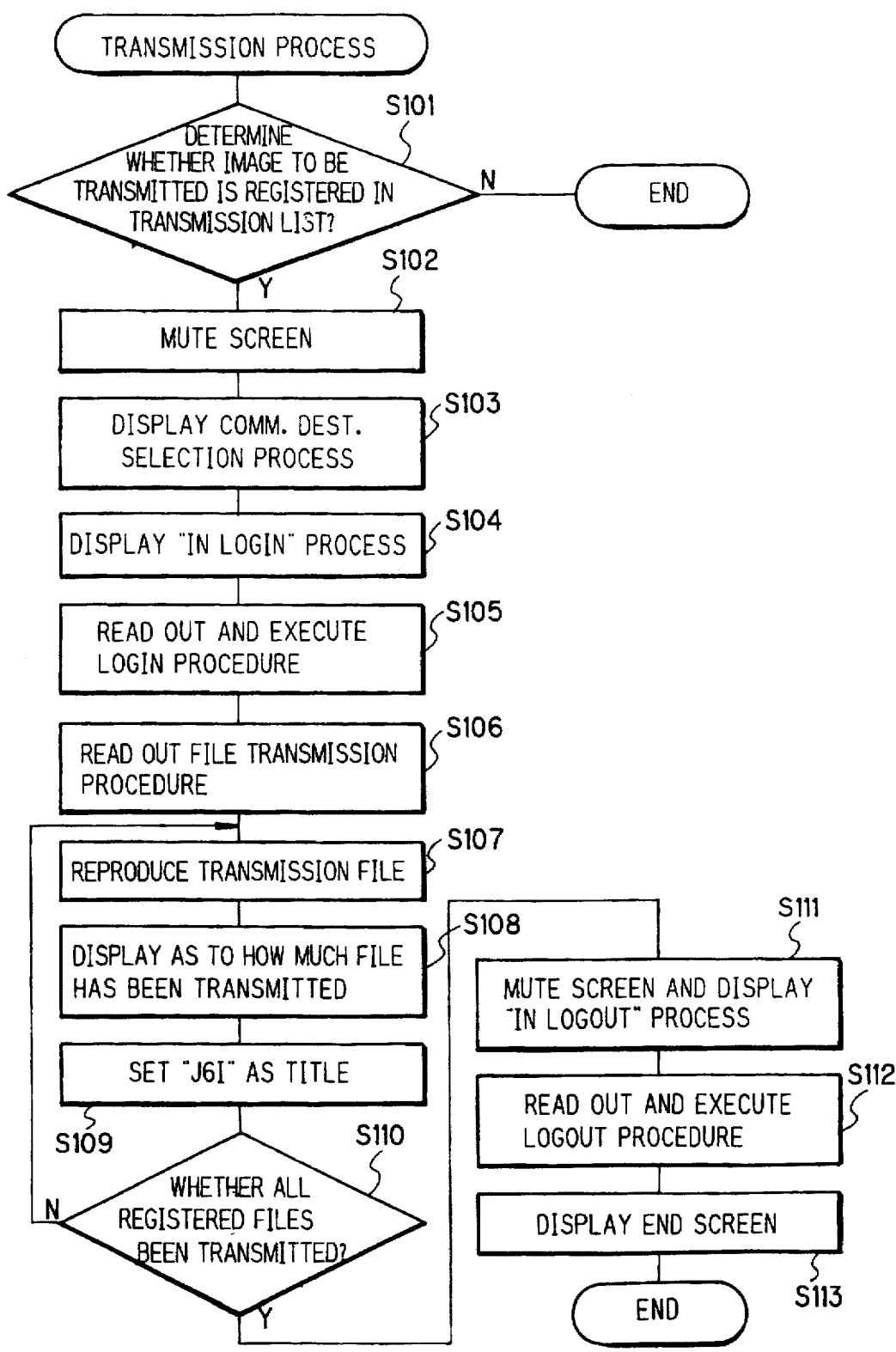
FIG. 34 shows a modification of FIG. 20 in the first embodiment.

FIG. 34 shows a modification of FIG. 20 in the first embodiment.

When the registration routine as described before in connection with FIG. 33 is ended, the image file to be transmitted must be registered in a list in the system controller 12. In step S101 of the transmission routine, a check is made as to whether the image to be transmitted has been registered in the transmission list. If the image to be transmitted has not been registered, the transmission is impossible, and therefore the routine is ended immediately. If it is determined in step S101 that the image to be transmitted has been registered, the routine goes to step S102 to mute the screen displayed on the monitor. This is done so in order to make the character display on the screen readily visible. The character display is not easily visible if the reproduced image to be transmitted is as such.

In step S103, the communication destination is selected. As described before, in this embodiment a plurality of communication destinations can be registered. This step is to select which one of such communication destinations. In step S104, login process is displayed. Specifically, a display "IN LOGIN" process is made on the monitor. The login procedure is read out and executed (step S105). In step S106, the file transmission procedure is read out and the initial transmission file in the transmission list is reproduced (step S107). This is done so in order to inform the operator of which transmission image file is transmitted.

In step S108, actual file transmission is executed, and a display as to how much of the file has been transmitted is made. "J6I" is set as a title of the file that has been transmitted (step S109). In step S110, a check is made as to whether all the registered files have been transmitted. If files to be transmitted are remaining, the routine goes back to step S107 to reproduce again and transmit the files to be transmitted. If it is determined in step S110 that all the registered files have been transmitted, step S111 is executed to mute the screen and make a screen "IN LOGOUT". In step S112, the logout procedure is actually read out and executed. In step S113, the end of the screen is displayed, thus bringing an end to the transmission routine.

Figure 35:
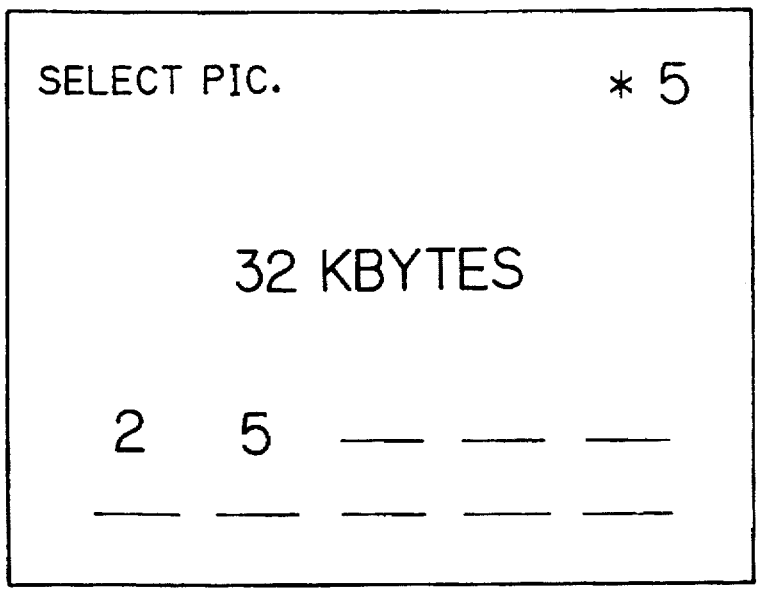
FIG. 35 shows the registration of image to be transmitted.

The registration of the image to be transmitted will be described again with reference to FIG. 35. This display is provided on the monitor connected to the camera or in the viewfinder therein. On the screen, the reproduced image of the frame which is selected at this time is observed. In FIG. 35, a picture is omitted because it is superimposed on the characters. The characters displayed on the screen are made as such by the character generator, and they are in superimposition on the video signal.

On the left upper part of this screen, "SELECT PIC", "SELECT PICTURE" or a like message with a content of picture selection is displayed. The number on the right upper part of the screen is the frame No. of the reproduced image. The asterisk provided on the left side of the frame No. has a meaning that the fifth frame is registered in the transmission list. Unless this frame is in the transmission list, this asterisk is not displayed.

32 KBYTES provided at the center of the screen represents the size of the image file now on display. On a lower part of the screen, numerals and/or horizontal bars are displayed. In the horizontal bar part, the frame Nos. registered in the transmission list are successively displayed. In this example, it happened to be displayed that two frames, i.e., the second and fifth frames, have been registered.

As described before in connection with FIG. 33 frames are fed by using the "UP" and "DOWN" switches 14d and 14e, and the "EXECUTE" switch 14d is depressed when a frame that is desired to be transmitted. When the "EXECUTE" switch 14d is depressed upon display of a frame which has not been registered in the transmission list, the frame is added successively to the list. If a frame which is not desired to be transmitted has been registered erroneously, such a frame can be deleted from the transmission list by depressing the trigger switch 19 again after the display of that image. In this way, it is possible to produce a transmission list while directly observing images to be transmitted as such.

Figure 36:
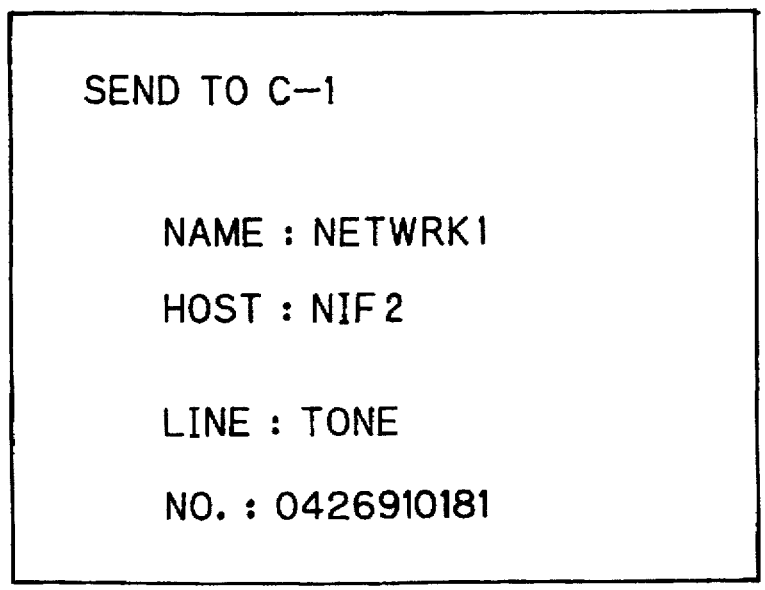
FIG. 36 shows an embodiment of the transmission destination selection part.

FIG. 36 shows an embodiment of the transmission destination selection part.

The display is made while step S103 in FIG. 34 is executed. In the screen shown in FIG. 36, the background scene is muted, it is not a state where the image data is displayed on the background scene as shown in FIG. 35. On the left side of the screen, "SEND TO" represents the image transmission mode, and the following "C-1" is "1" of the communication destination. At this time, by depressing "UP" and "DOWN" switches 14d and 14e, it is possible to display and select as many as the registered communication destination.

"NAME" column shows a partner name ("NETWORK"), "HOST" column is ID ("NIF2") of protocol communicated with the partner, and "LINE" column is the type of line used by camera, here "TONE" denotes the "TONE line of the telephone.

The transmission destination can be selected by observing the screen in FIG. 36 as described above.

Figure 37:
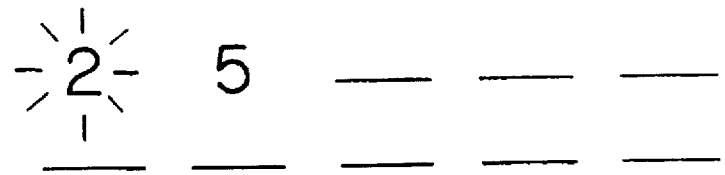
FIG. 37 is a screen showing the actual transmission processes subsequent to the step S104 in FIG. 34.

FIG. 37 is a screen showing the actual transmission processes subsequent to the step S104 in FIG. 34. If the transmission is started, the leading frame of the transmission list is reproduced. In FIG. 36, the whole screen is muted, however, the image of the second frame is displayed on the background scene in FIG. 37. This enables the operator to confirm which image has been transmitted by observing the screen.

"REST:32 KBYTES" displayed on the central part of the screen in FIG. 37 shows the residual number of bytes of the transmission. In proportion as the transmission has made progress, "32" is counted down gradually, and when it reaches to "0", the transmission is completed.

The frame No. of the image in transmission is flickering in the list. For this example, "2" is flickering because the second frame is in transmission. When this second frame transmission is completed, the reproduced screen transfers to the frame "5" and "5" is reproduced on the back.

Successively, a transmission file size at that time is displayed at the first place and count down operation is executed again. The transmission is completed, the screen of FIG. 36 is returned, and the logout process is started.

FIG. 36 is displayed in a case where the processes subsequent to step S111 of FIG. 34 are processed.

In the foregoing embodiments of the DSC 30, the HD unit is adopted as large capacity storage medium, but this is by no means limitative; for instance, it is possible to adopt an opto-magnetic disk unit, a large capacity flash memory, etc. as well.

As has been described, one type of the electrophotographic system according to the present invention permits transmission and reception of image data and/or data stored in a storage medium to be executed handily with an electrophotographic unit by merely using small size modems or the like.

Another type of system according to the present invention permits large amounts of imaging even where there is no storage medium capable of mounting and dismounting and also permits the imaging data to be filed or taken in a personal computer network host when desired.

In the foregoing embodiments, other storage medium such as mountable memory card may be employed as the information storage means. As the other data communication means ISDN and LAN such as INSERNET may be used instead of the telephone lines.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. An electronic still camera, comprising:

image pick-up means for generating and outputting an image signal photoelectrically converted from an image incident thereon;

image data storing means for storing image data, corresponding to said image signal issued from said image pick-up means on an applied storage device or medium;

data communication means for transmitting designated image data in said storage device or medium through a personal computer network organization while an operation mode of the system is set for communication;

switch means for causing said communication means to start a communication mode operation; and operation mode changing means including a first switch and a second switch, said first switch for switching a camera mode and a communication mode, said second switch for switching a play mode and a recording mode while said camera mode is set by said first switch, and for switching a receiving mode and a transmitting mode while a communication mode is set by said first switch.

2. The electronic still camera according to claim 1, further comprising registering means for registering an access procedure to a network with the inter-personal computer communication system fitted for network organization in a form capable of being utilized.

3. The electronic still camera according to claim 2, wherein the registering means is capable of registering at least one of a telephone No., an ID, and a password, corresponding to each of a plurality of data transmission destinations.

4. The electronic still camera according to claim 3, further comprising automatic accessing means for accessing a pertinent mail box in a network through automatic login execution with respect to the network according to the telephone No., ID or password registered in the registering means in correspondence to a communication destination acknowledged by a communication destination acknowledging means.

5. The electronic still camera according to claim 2, further comprising mark adding means for automatically adding a predetermined mark representing particular attribute information to a file title when image data obtained by at least one of an image means and data stored in a mounted information storage medium and in a file form are uploaded in a host in the network.

6. The electronic still camera according to claim 1, further comprising automatic selection downloading means for executing downloading by automatically selecting a file with a predetermined mark representing predetermined attribute information from a host in the network.

7. The electronic still camera according to claim 6, further comprising deleting means for deleting a file that has been downloaded.

8. The electronic still camera according to claim 6, further comprising means for automatically generating a file name of a file having been downloaded.

9. The electronic still camera according to claim 1, further comprising accessing procedure reading means for reading out a predetermined accessing procedure from an information storage medium, in which is stored procedure for accessing a pertinent network in the inter-personal computer communication system fitted for network organization.

10. The electronic still camera according to claim 1, further comprising confirmation means for confirming the image to be transmitted before transmission.

11. The electronic still camera according to claim 1, further comprising means for registering the image to be transmitted and transmitting the registered image.

12. The electronic still camera according to claim 1, wherein said data communication means includes means for reading from a storage device a communication protocol for accessing said personal computer network.

13. The electronic still camera according to claim 1, further comprising means for displaying a registration menu indicating that a registration operation has started.

14. The electronic still camera according to claim 1, further comprising means for checking validity of files retrieved from said storage device and for checking identification information associated with each of said files.

15. The electronic still camera according to claim 1, further comprising determining means for determining that said communication mode is in use and then signalling said displaying means to display said registration menu.

16. The electronic still camera according to claim 13, further comprising recovery means for recovering a protocol data file from said storage means during a protocol registrations process.

17. The electronic still camera according to claim 16, wherein when said protocol data file is successfully read, the data file is stored in an EEPROM.

18. The electronic still camera according to claim 1, wherein a plurality of image signals are converted to a plurality of image data and stored in said applied storage device, and wherein said data communication means includes means for sequentially transmitting said image data in one of the forward and reverse order.

19. The electronic still camera according to claim 1, further comprising means for signalling when transmission of said image has been successful and for labelling said image data corresponding to successful transmission.

20. The electronic still camera according to claim 19, wherein said imaging system includes means for uploading said labelled image data to said data communication means.

21. The electronic still camera according to claim 20, further comprising registering means having a receipt protocol, wherein said uploaded image data is received by said data communication means according to said receipt protocol to form a transmission list of image data.

22. The electronic still camera according to claim 21, further comprising means for deleting said uploaded image data received by said data communication means and said storage device after successful reception.

23. The electronic still camera according to claim 19, wherein said labelled image data includes labels describing said image data.

24. The electronic still camera according to claim 21, further comprising means for creating a filename of said when said uploaded image data is transmitted through said personal computer network organization.

25. The electronic still camera according to claim 24, further comprising deletion means for deleting said image data if said image data is on said transmission list when transmission is accomplished.

26. The electronic still camera according to claim 25, further comprising means for informing an operator of which of said plurality of image data is being transmitted.

* * * * *